(12) United States Patent
Oomura et al.

(10) Patent No.: US 7,319,532 B2
(45) Date of Patent: Jan. 15, 2008

(54) PRINTING CONTROL APPARATUS AND PRINTING CONTROL METHOD CAPABLE OF ACCURATELY PRINTING EMBEDDED FONT

(75) Inventors: Hiroshi Oomura, Kanagawa (JP); Masanari Toda, Kanagawa (JP); Tatsuro Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 10/180,139

(22) Filed: Jun. 27, 2002

(65) Prior Publication Data
US 2003/0002063 A1    Jan. 2, 2003

(30) Foreign Application Priority Data
Jun. 28, 2001 (JP) .............................. 2001-197286
Jun. 28, 2001 (JP) .............................. 2001-197287

(51) Int. Cl.
*G06F 15/00* (2006.01)
*G06K 1/00* (2006.01)
*G06K 15/02* (2006.01)

(52) U.S. Cl. ..................... 358/1.11; 358/1.9; 358/1.12; 358/1.16

(58) Field of Classification Search .................. 358/1.1, 358/1.2, 1.15, 1.9, 1.11, 1.12, 1.16
See application file for complete search history.

(56) References Cited

U.S. PATENT DOCUMENTS

| 5,592,593 | A | * | 1/1997 | Speed | 358/1.11 |
| 5,608,542 | A | * | 3/1997 | Krahe et al. | 358/449 |
| 5,857,064 | A | * | 1/1999 | deSilva | 358/1.13 |

FOREIGN PATENT DOCUMENTS

JP    3-8059    1/1991

* cited by examiner

*Primary Examiner*—Twyler Lamb
*Assistant Examiner*—Yixing Qin
(74) *Attorney, Agent, or Firm*—Fitzpatrick, Cella, Harper & Scinto

(57) ABSTRACT

Disclosed is a printing control apparatus in which a printing instruction is once converted into an intermediate code format and then converted into a printer control command, and which can correctly print an embedded font. In this invention, a spooler for converting a printing instruction into an intermediate code format and storing this intermediate code format detects the presence/absence of an embedded font on the basis of font attributes contained in the printing instruction. If an embedded font is detected, the spooler acquires the embedded font (S3.3) and spools the font by the intermediate code format (S3.4). The despooler registers the spooled embedded font in a graphic engine (D3), and a printer driver generates a control command by using the registered embedded font (Drv3.1).

17 Claims, 16 Drawing Sheets

FIG. 5
- CHARACTER CODE
| CHARACTER | A | B | C | ア | イ | ウ |
|---|---|---|---|---|---|---|
| ShiftJIS | 0x41 | 0x42 | 0x43 | 0xB1 | 0xB2 | 0xB3 |
| UNICODE | 0x0041 | 0x0042 | 0x0043 | 0x30A2 | 0x30A4 | 0x30A6 |
- FONT ATTRIBUTES
  FACE NAME : "GOTHIC"  BOLD : DESIGNATED  POINTS : 18
  FACE NAME : "MINCHO"  BOLD : DESIGNATED  POINTS : 18
- FONT
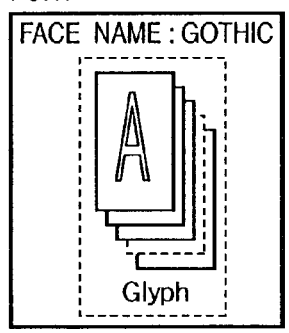
FACE NAME : GOTHIC
Glyph
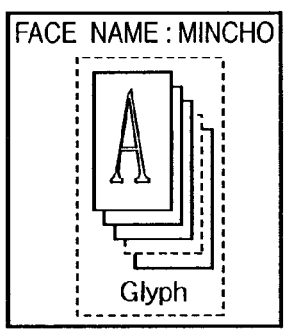
FACE NAME : MINCHO
Glyph
- DRAWING ATTRIBUTES
  POITION, COLOR, CLIP
PRINTING INFORMATION
```
GOTHIC
ABCアイウ
MINCHO
ABCアイウ
```
PRINTING RESULTS

FIG. 6

· CHARACTER CODE

| CHARACTER | A | B | C | ア | イ | t |
|---|---|---|---|---|---|---|
| ShiftJIS | 0x41 | 0x42 | 0x43 | 0xB1 | 0xB2 | NONE |
| UNICODE | 0x0041 | 0x0042 | 0x0043 | 0x30A2 | 0x30A4 | 0x20A4 |

· FONT ATTRIBUTES
  FACE NAME : "GOTHIC"   BOLD : DESIGNATED   POINTS : 18
  FACE NAME : "Arial"    BOLD : DESIGNATED   POINTS : 18

· FONT

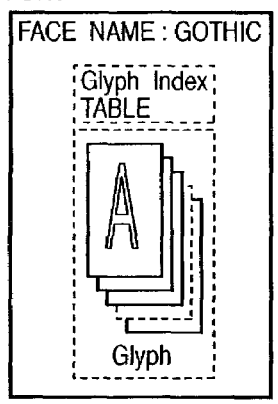

FACE NAME : GOTHIC
Glyph Index TABLE
Glyph

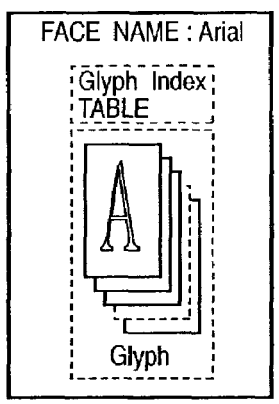

FACE NAME : Arial
Glyph Index TABLE
Glyph

GOTHIC

ABCアイ ·

Arial

ABC□□□t

PRINTING RESULTS

· DRAWING ATTRIBUTES
  POITION, COLOR, CLIP

PRINTING INFORMATION

FIG. 8

FACE NAME : GOTHIC
NUMBER OF DEFINITIONS OF Glyph : 100
Glyph Index TABLE :

| CHARACTER | A | B | C | ア | イ | t |
|---|---|---|---|---|---|---|
| ShiftJIS | 0x41 | 0x42 | 0x43 | 0xB1 | 0xB2 | NONE |
| UNICODE | 0x0041 | 0x0042 | 0x0043 | 0x30A2 | 0x30A4 | 0x20A4 |
| Glyph Index | 0x0001 | 0x0002 | 0x0003 | 0x0041 | 0x0042 | NONE |

Glyph ENTITY :

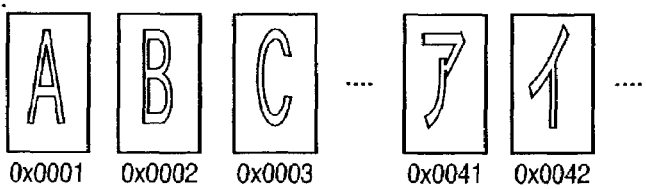

Glyph Index   0x0001   0x0002   0x0003    0x0041   0x0042

FACE NAME : Arial
NUMBER OF DEFINITIONS OF Glyph : 50
Glyph Index TABLE :

| CHARACTER | A | B | C | ア | イ | t |
|---|---|---|---|---|---|---|
| ShiftJIS | 0x41 | 0x42 | 0x43 | 0xB1 | 0xB2 | NONE |
| UNICODE | 0x0041 | 0x0042 | 0x0043 | 0x30A2 | 0x30A4 | 0x20A4 |
| Glyph Index | 0x0011 | 0x0012 | 0x0013 | NONE | NONE | 0x0003 |

Glyph ENTITY :

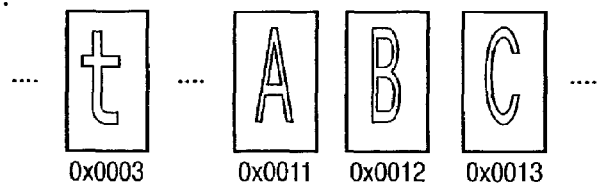

Glyph Index    0x0003    0x0011   0x0012   0x0013

PRINTING CONTROL APPARATUS AND PRINTING CONTROL METHOD CAPABLE OF ACCURATELY PRINTING EMBEDDED FONT

FIELD OF THE INVENTION

The present invention relates to a printing control apparatus and printing control method of supplying printing control commands to a printing apparatus such as a printer and, more particularly, to a printing control apparatus and printing control method which once convert a printing instruction from an application program into a data format (a so-called intermediate code) different from printing data to be finally supplied to the printer, and again convert the intermediate code into the control command.

BACKGROUND OF THE INVENTION

FIG. 3 is a block diagram showing an outline of a functional configuration related to a printing process in a host computer as a printing control apparatus which designates printing to a printer 1500 connected to this host computer directly or across a network. The printing process is started when a user of the host computer designates printing from an application 201 such as a wordprocessor program or spreadsheet program.

The application 201 analyzes application data containing character drawing data and the like, and calls a graphic engine 202 provided by an OS (basic software).

The graphic engine 202 loads a printer driver 203 prepared in accordance with the type of the printer 1500, and transfers the output from the application 201 to this printer driver 203. The graphic engine 202 then converts a GDI (Graphic Device Interface) function received from the application 201 into a DDI (Device Driver Interface) function, and outputs this DDI function to the printer driver 203.

On the basis of the DDI function received from the graphic engine 202, the printer driver 203 converts the data into a control command, e.g., a PDL (Page Description Language), which can be recognized by the printer. The converted printer control command is output as printing data from a system spooler 204 to the printer 1500 via an interface 21.

The printer 1500 interprets and expands this control command into bitmap data, and finally outputs the printing result onto a printing medium such as paper.

FIG. 5 is a schematic view showing information necessary for character drawing in the printing process. As shown in FIG. 5, the following information is generally required for character drawing.

Character Code

Character information to be expressed by character drawing. A code based on a predetermined code system such as ASCII, ShiftJIS, or Unicode is used. Some OSs support only a predetermined character code (e.g., ShiftJIS). ShiftJIS has no definitions for British pound (not "£" but a character formed by adding a lateral bar to "L". In this specification, British pound indicates this character) and a Euro symbol. Therefore, these characters must be expressed by using another character code such as Unicode which supports these characters. If an OS supports only ShiftJIS, British pound cannot be expressed on the OS. An OS uses various means to avoid this event. These means will be explained later.

Font Attributes

Information such as a face name suited to character drawing, the presence/absence of designation of Italic/bald representing modification to a glyph, and the number of points indicating the size of a character.

Font

Information representing the shape of character drawing designated by a face name such as Gothic, Mincho, Times New Roman or Arial. This information contains drawing shape information (called a glyph) of each character. Font information formats are roughly divided into a bitmap font and an outline font, and various formats such as TrueType and OpenType are defined. Internal information of a font will be explained in more detail later.

Drawing Attributes

Information representing the drawing position, color, clip condition, and the like of a character.

If not all of these pieces of information are obtained, character drawing intended by the user is not accomplished. A font is information representing a character drawing shape. However, necessary fonts are not always present in all environments owing to, e.g., the copyright. In other words, a font present in an environment in which a user forms character drawing data may not be present in an environment in which character drawing is performed. As means for performing character drawing with a font intended by a user or with a font having a shape similar to the font intended by the user even if the font intended by the user does not exist in an environment in which the drawing is to be performed, 1) font replacement, 2) bitmap replacement, and 3) font embedding are conventionally known. These means will be explained below with reference to FIG. 7 which shows the drawing results when these means are used.

1. Font Replacement

A method of performing drawing using a font close to font attributes in character drawing data in a character drawing execution environment. Since a font different from the intended font is used, as shown in the upper right row in FIG. 7, a character having a shape entirely different from the one intended by the user maybe drawn. In the worst case, a font corresponding to the intended character code does not exist in a character drawing execution environment, so drawing (printing) which cannot be perceived as a character may be performed.

2. Bitmap Replacement

A method of converting a character into a bitmap when character drawing data is to be formed, thereby converting character drawing into bitmap drawing. This bitmap drawing normally looks the same as character drawing intended by the user. Since the character is drawn as a bitmap, however, the character quality sometimes lowers owing to the influence of the bitmap resolution if the character is enlarged/reduced as shown in the middle right row in FIG. 7.

3. Font Embedding

A method of embedding a font into character drawing data and thereby carrying the font to an environment in which character drawing is actually performed. The embedded font is registered in a character drawing execution environment before character drawing. Therefore, all information is obtained, so character drawing is performed by the format intended by the user. However, when the embedded font is to be registered, caution should be exercised so as not to infringe the copyright. For example, if the embedded font is originally not present in a drawing environment, the registered font must be erased after printing is completed. When printing by an application is completed, therefore, the registered font is discarded from the system so as not to be used by another application. This font embedding has the advantage that an output intended by the user can be obtained even if the designated font does not exist in a character drawing environment. However, character drawing data often increases in size because font information is embedded in the character drawing data. This problem is particularly notable when a font such as a Japanese font having a larger number of character types is embedded.

The operations of the application 201, the graphic engine 202, and the printer driver 203 of the conventional apparatus when character drawing data in which a font is embedded is to be printed will be explained below with reference to a sequence chart shown in FIG. 9.

Step A1. The application 201 notifies the graphic engine 202 via a GDI function that a print job is to be started (the graphic engine 202 converts the notified GDI function into a DDI function and transfers this DDI function to the printer driver 203).

Step Drv1. The printer driver 203 generates a PDL command for job start control.

Step A2. The application 201 notifies the graphic engine 202 via a GDI function that page printing is to be started (the graphic engine 202 transfers the function to the printer driver 203 as in step A1).

Step Drv2. The printer driver 203 generates a PDL command for page start control.

Step A3. The application 201 registers an embedded font in application data into the graphic engine 202. This registration makes it possible to use information of the font essential to character drawing even in this environment.

Step G1. The graphic engine 202 holds the font information.

Step A4. The application 201 performs character drawing by a GDI function using the font registered in step A3 (the graphic engine 202 transfers the function to the printer driver 203 as in step A1).

Step Drv3. The printer driver 203 acquires a glyph of the character by the following processing, in order to generate a character drawing command.

Step Drv3.1. The printer driver 203 issues a character glyph acquisition request to the graphic engine 202.

Step G2. The graphic engine 202 generates a character glyph from the font registered in step G1, and transfers the glyph to the printer driver 203.

Step A5. The application 201 deletes the font registered in step A3 from the graphic engine 202.

Step G3. The embedded font held by the graphic engine 202 is discarded.

Step A6. The application 201 notifies the graphic engine 202 via a GDI function that page printing is completed (the graphic engine 202 transfers the function to the printer driver 203 as in step A1).

Step Drv4. The printer driver 203 generates a PDL command for page end control.

Step A7. The application 201 notifies the graphic engine 202 via a GDI function that the print job is to be completed (the graphic engine 202 transfers the function to the printer driver 203 as in step A1).

Step Drv5. The printer driver 203 generates a PDL command for job end control.

The information stored in a font will be described in more detail below with reference to FIG. 8. A font contains primarily the following information.

Face Name

An identification name for identifying a font to be used.

Number of Glyph Definitions

The number of definitions of a glyph representing the shape of a character defined in a font.

Glyph Index Table

To use various character codes with a single font, a font such as TrueType or OpenType defines an identifier independent of a character code for each glyph in the font, thereby managing glyphs independently of character codes. This glyph identifier is generally called a glyph index. By preparing a correspondence table of character codes and corresponding glyph indices for each character code system, various character codes can be used with a single font. This correspondence table is called a glyph index table. FIG. 8 shows two glyph index tables. A common glyph index table has a data format in which a glyph index is extracted from a character code.

Glyph

Information representing the shape of a character. Bitmaps, paths, and curves are examples of a method of representing a glyph. Each defined glyph is identified by a font-dependent glyph index in a font. Since a glyph index is font-dependent, as shown in FIG. 8, a glyph index of "A" is 0x0001 in a "Gothic" font and is 0x0011 in an "Arial" font. Usually, a glyph index changes in accordance with a font even for the same character.

Like British pound in the "Gothic font" and "ア" and "イ" in the "Arial" font (alphanumeric font), some characters have no defined glyphs depending on fonts. When characters like these are to be printed, as shown on the right-hand side of FIG. 6, characters representing glyph-undefined characters such as "•" and "□" are printed in accordance with a designated font.

When an OS which supports only ShiftJIS as an internal character code is used, British pound cannot be displayed even by the "Arial" font in which the glyph of British pound is defined, because no definition of a ShiftJIS character code for British pound exists. For commercial uses of an OS, inability to display general symbols such as British pound (a character formed by adding a lateral bar to "L") and a Euro symbol is unpreferable. Therefore, an OS exists which designates information for character drawing by using a font-dependent glyph index instead of a character code.

The operations of the application 201, the graphic engine 202, and the printer driver 203 when conventional glyph index printing is to be performed in a printing control apparatus using an OS which cannot use Unicode as an internal structure will be described below with reference to a sequence chart shown in FIG. 10. Note that the same reference numerals as in FIG. 9 denote the same processes in FIG. 10, and a repetitive explanation thereof will be omitted.

Steps A1 to Drv2 are the same as in FIG. 9.

Step A3. The application 201 uses Unicode to request character drawing which cannot be expressed by ShiftJIS.

Step G1. Since Unicode cannot be used in the OS, the graphic engine 202 looks up a glyph index table corresponding to a font of the character designated by Unicode, converts into a glyph index contained in the table and corresponding to Unicode, and transfers the glyph index as a character code of character drawing to the printer driver 203.

Step Drv3. To generate a character drawing command, the printer driver 203 acquires a character glyph by performing the following processing by using the glyph index.

Step Drv3.1. The printer driver 203 acquires a character glyph by designating the glyph index to the graphic engine 202.

Step G2. The graphic engine 202 acquires a glyph of the designated glyph index from the font data, and transfers the glyph to the printer driver 203.

The processing is completed by executing steps A6 and A7 as in FIG. 9.

The processing shown in FIGS. 9 and 10 is performed by a single process; when the application 201 calls a GDI function, those process routines of the graphic engine 202 and the printer driver 203, which are required to realize functions of the called GDI function start operating, thereby generating a PDL command corresponding to the contents of the call.

Since the GDI function call by the application 201 is completely linked to the processes by the graphic engine 202 and the printer driver 203, the operation procedure between the application 201, the graphic engine 202, and the printer driver 203 is assured. This ensures that a font is held by the graphic engine 202 in Step Drv3.1 Character Glyph Acquisition which is the processing step by the printer driver 203.

FIG. 4 is a functional block diagram of a host computer including a spooler and a despooler and its related functions in addition to the configuration shown in FIG. 3. Before printing data to be transmitted to a printer is generated, the spooler temporarily saves data in a data format (a so-called intermediate code) different from the printing data to be finally transmitted to the printer. From this data temporarily saved in the intermediate code format, the despooler generates the printing data to be finally transmitted to the printer. That is, in the host computer shown in FIG. 4, when a printing instruction is to be transmitted from a graphic engine 202 to a printer driver 203, a spool file 303 made up of intermediate codes is once generated. After that, the despooler converts this spool file into printing data and outputs the data to the printer.

In the host computer shown in FIG. 3 described earlier, the application 201 is released from the printing process when the printer driver 203 has completely converted all printing instructions from the graphic engine 202 into control commands of the printer 1500. In contrast, in the host computer shown in FIG. 4, the application 201 is released from the printing process when a spooler 302 has converted all printing instructions into intermediate code data and output the data to the spool file 303. Usually, the application 201 is released from the printing process within a shorter time period in the latter case (the configuration shown in FIG. 4).

Also, when the configuration shown in FIG. 4 is used, the contents of the spool file 303 can be processed before printing. This can realize functions which the application does not have, e.g., enlarged/reduced printing and N-up printing by which a plurality of (N) pages are printed as they are reduced into one page. Note that the spool file 303 is usually processed by performing settings from a window provided by the printer driver 203, and saving the set contents on a memory such as a RAM or HD by the printer driver 203.

From the above advantages, transition from the configuration shown in FIG. 3 to the configuration in which spooling is performed using intermediate code data as shown in FIG. 4 is advancing.

A process of printing font-embedded data in the host computer having the functional arrangement shown in FIG. 4 will be explained below with reference to FIG. 11.

This processing cannot be done by a single process, unlike the processing by the functional arrangement shown in FIG. 3. To control a plurality of jobs, queue processing between an application process and a despooler process must be realized. In practice, communication between these two processes is performed via a spool file manager 304. To simplify the explanation, however, the spool file manager 304 including the queue processing is regarded as one communication medium and omitted from FIG. 11 and from the following explanation.

Step A1. The application 201 notifies the graphic engine 202 via a GDI function that a print job is to be started (the graphic engine 202 converts the notified GDI function into a DDI function and outputs this DDI function to a dispatcher 301, and the dispatcher 301 transfers the contents to the spooler 302).

Step S1. The spooler 302 generates, in the spool file 303, a job file which holds information, such as a paper size, concerning the job, and activates a despooler 305 as another process.

Step D1. The despooler 305 reads the job file and calls a GDI function for starting the print job (the graphic engine 202 converts the notified GDI function into a DDI function and outputs this DDI function to the dispatcher 301, and the dispatcher 301 transfers the contents to the printer driver 203).

Step Drv1. The printer driver 203 generates a PDL command for job start control.

Step A2. The application 201 notifies the graphic engine 202 via a GDI function that page printing is to be started (the graphic engine 202 converts the notified GDI function into a DDI function and outputs this DDI function to the dispatcher 301, and the dispatcher 301 transfers the contents to the spooler 302).

Step S2. The spooler 302 generates, in the spool file 303, a page file which holds information concerning a page.

Step A3. The application 201 registers an embedded font in application data into the graphic engine 202. This registration makes it possible to use information of the font essential to character drawing even in this environment.

Step G1. The graphic engine 202 holds the font information.

Step A4. The application 201 performs character drawing by using a font including the font registered in step A3 (the graphic engine 202 converts a GDI function called upon drawing into a DDI function and outputs this DDI function to the dispatcher 301, and the dispatcher 301 transfers the contents to the spooler 302).

Step S3. The spooler 302 writes information representing character drawing as an intermediate code into the page file of the spool file. This intermediate code contains only "character code, font attributes, and drawing attributes" obtainable from the DDI function, and does not contain any font.

Step A5. The application 201 deletes the font registered in step A3 from the graphic engine 202.

Step G3. The embedded font held by the graphic engine 202 is discarded.

Step A6. The application 201 notifies the graphic engine 202 via a GDI function that page printing is completed (the graphic engine 202 converts the notified GDI function into a DDI function and outputs this DDI function to the dispatcher 301, and the dispatcher 301 transfers the contents to the spooler 302).

Step S4. The spooler 302 closes the page file and requests the despooler 305 to reproduce the page.

Step A7. The application 201 notifies the graphic engine 202 via a GDI function that the print job is to be completed (the graphic engine 202 converts the notified GDI function into a DDI function and outputs this DDI function to the dispatcher 301, and the dispatcher 301 transfers the contents to the spooler 302).

Step S5. The spooler 302 closes the job file and notifies the despooler 305 that no more pages are present.

Step D2. The despooler 305 calls a GDI function for page start in order to reproduce the intermediate code described in the page file generated in step S2 (the graphic engine 202 converts the notified GDI function into a DDI function and outputs this DDI function to the dispatcher 301, and the dispatcher 301 transfers the contents to the printer driver 203).

Step Drv2. The printer driver 203 generates a PDL command for page start control.

Step D3. The despooler 305 calls a GDI function to reproduce character drawing described in the intermediate code (the graphic engine 202 converts the GDI function called upon drawing into a DDI function and outputs this DDI function to the dispatcher 301, and the dispatcher 301 transfers the contents to the printer driver 203).

Step Drv3. To generate a character drawing command, the printer driver 203 acquires a character glyph by the following processing.

Step Drv3.1. The printer driver 203 acquires a character glyph from the graphic engine.

Step G4. The graphic engine 202 searches for a font having the face name designated in the font attributes. However, the font (which is embedded and originally not present in this environment) is already discarded in step G3, and so the glyph of this font cannot be transferred even if requested. Therefore, on the basis of a predetermined relationship a glyph is formed using an alternate font of a type close to the font whose glyph is requested, and the result is transferred to the printer driver 203.

Step D6. The despooler 305 notifies the graphic engine 202 via a GDI function that the page printing is completed (the graphic engine 202 converts the notified GDI function into a DDI function and outputs this DDI function to the dispatcher 301, and the dispatcher 301 transfers the contents to the printer driver 203).

Step Drv4. The printer driver 203 generates a PDL code for page end control.

Step D7. The despooler 305 notifies the graphic engine 202 via a GDI function that the print job is to be completed (the graphic engine 202 converts the notified GDI function into a DDI function and outputs this DDI function to the dispatcher 301, and the dispatcher 301 transfers the contents to the printer driver 203).

Step Drv5. The printer driver 203 generates a PDL command for job end control.

Processing when the host computer as a printing control apparatus shown in FIG. 4 prints font-embedded data by using an OS which cannot use Unicode as an internal structure is indicated by a sequence chart shown in FIG. 12.

As shown in FIG. 12, this processing cannot be performed by a single process as in FIG. 11 described above. To control a plurality of jobs, queue processing between an application process and a despooler process must be realized. In practice, communication between these two processes is performed via the spool file manager 304. To simplify the explanation, however, the spool file manager 304 including the queue processing is regarded as one communication medium and omitted from FIG. 12 and from the following explanation.

Also, the same reference numerals as in FIG. 11 denote the same processes in FIG. 12, and a repetitive explanation thereof will be omitted.

Processes in steps A1 to S2 are the same as in FIG. 11.

Step A3'. The application 201 uses Unicode to request character drawing which cannot be expressed by ShiftJIS.

Step G1'. Since Unicode cannot be used in the OS, the graphic engine 202 looks up a glyph index table corresponding to a font of the character designated by Unicode, and transfers to the printer driver 203 a glyph index corresponding to the designated character code (Unicode) as a character code of character drawing.

Step S3. The spooler 302 writes information representing character drawing as an intermediate code into the page file of the spool file. This intermediate code contains only "character code, font attributes, and drawing attributes" obtainable from the DDI function, and does not contain any font.

Steps A6 to Drv2 are the same as in FIG. 11.

Step D3'. The despooler 305 calls a GDI function to reproduce character drawing described in the intermediate code. The character code of this intermediate code contains a font-dependent glyph index code (the graphic engine 202 converts the GDI function called upon drawing into a DDI function and outputs this DDI function to the dispatcher 301, and the dispatcher 301 transfers the contents to the printer driver 203).

Step Drv3'. To generate a character drawing command, the printer driver 203 acquires a character glyph by the following processing by using the glyph index as a character code.

Step Drv3.1'. The printer driver 203 acquires a character glyph from the graphic engine by using the glyph index.

Step G4'. The graphic engine 202 searches for a font having the face name designated in the font attributes. If a font having the designated face name exists, a glyph can be acquired by the font-dependent glyph index. However, if this font is an embedded font, the application 201 has discarded the font registered in the OS in some cases.

If a font having the designated face name does not exist on the graphic engine 202, a glyph is formed using another font of a close type by font replacement. When this font replacement is performed, it is highly likely that a glyph different from the character intended by the user is acquired if the glyph is acquired using a font-dependent glyph index.

After that, the processing is completed by executing steps D6 to Drv5 in the same manner as in FIG. 11.

As shown in FIGS. 11 and 12, the above processing is performed by the two processes, i.e., the application process and despooler process. It is not ensured that a font registered in the graphic engine 202 by the application 201 is present in the graphic engine 202 when a spool file is reproduced by the despooler.

If no embedded font is present in the graphic engine 202, font replacement occurs as explained in step G4, so the font designated by the intermediate data is replaced with another font. In the processing shown in FIG. 11, therefore, as indicated in the uppermost right row in FIG. 7, the data may be output in a shape different from the shape intended by the user. Also, in the processing shown in FIG. 12, it is highly likely that no intended character glyph is acquired by the use of a font-dependent glyph index. Furthermore, since not a character code but a font-dependent glyph index code is supplied to the printer driver 203, a font replacement function using a built-in font of the printer cannot be applied.

To avoid this problem, a method of performing bitmap replacement during spooling can be performed to prevent font replacement of step G4.

First, a possible operation as a printing process in which bitmap replacement is performed during spooling will be described with reference to FIG. 13.

Step A1. The application 201 notifies the graphic engine 202 via a GDI function that a print job is to be started (the graphic engine 202 converts the notified GDI function into a DDI function and outputs this DDI function to the dispatcher 301, and the dispatcher 301 transfers the contents to the spooler 302).

Step S1. The spooler 302 generates, in the spool file 303, a job file which holds information, such as a paper size, concerning the job, and activates the despooler 305 as another process.

Step D1. The despooler 305 reads the job file and calls a GDI function for starting the print job (the graphic engine 202 converts the notified GDI function into a DDI function and outputs this DDI function to the dispatcher 301, and the dispatcher 301 transfers the contents to the printer driver 203).

Step Drv1. The printer driver 203 generates a PDL command for job start control.

Step A2. The application 201 notifies the graphic engine 202 via a GDI function that page printing is to be started (the graphic engine 202 converts the notified GDI function into a DDI function and outputs this DDI function to the dispatcher 301, and the dispatcher 301 transfers the contents to the spooler 302).

Step S2. The spooler 302 generates, in the spool file 303, a page file which holds information concerning a page.

Step A3. The application 201 registers an embedded font in application data into the graphic engine 202. This registration makes it possible to use information of the font essential to character drawing even in this environment.

Step G1. The graphic engine 202 holds the font information.

Step A4. The application 201 performs character drawing by using a font including the font registered in step A3 (the graphic engine 202 converts a GDI function called upon drawing into a DDI function and outputs this DDI function to the dispatcher 301, and the dispatcher 301 transfers the contents to the spooler 302).

Step S3. The spooler 302 writes information representing character drawing as an intermediate code into the page file of the spool file. If the font attribute contained in this intermediate code is an embedded font, the following processing is performed to eliminate the difference between drawn characters resulting from font replacement.

Step S3.1. The spooler 302 acquires a character glyph from the graphic engine 202.

Step G2. The graphic engine 202 generates a character glyph from the font and transfers the generated glyph to the spooler 302.

Step S3.2. The spooler 302 uses the received character glyph to convert character drawing into bitmap drawing, and spools as an intermediate code.

Step A5. The application 201 deletes the font registered in step A3 from the graphic engine 202.

Step G3. The embedded font held by the graphic engine 202 is discarded.

Step A6. The application 201 notifies the graphic engine 202 via a GDI function that page printing is completed (the graphic engine 202 converts the notified GDI function into a DDI function and outputs this DDI function to the dispatcher 301, and the dispatcher 301 transfers the contents to the spooler 302).

Step S4. The spooler 302 closes the page file and requests the despooler 305 to reproduce the page.

Step A7. The application 201 notifies the graphic engine 202 via a GDI function that the print job is to be completed (the graphic engine 202 converts the notified GDI function into a DDI function and outputs this DDI function to the dispatcher 301, and the dispatcher 301 transfers the contents to the spooler 302).

Step S5. The spooler 302 closes the job file and notifies the despooler 305 that no more pages are present.

Step D2. The despooler 305 calls a GDI function for page start in order to reproduce the intermediate code described in the page file generated in step S2 (the graphic engine 202 converts the called GDI function into a DDI function and outputs this DDI function to the dispatcher 301, and the dispatcher 301 transfers the contents to the printer driver 203).

Step Drv2. The printer driver 203 generates a PDL command for page start control.

Step D8. The despooler 305 converts the intermediate code, of bitmap drawing converted from character drawing, on the page file into a GDI function call (the graphic engine 202 converts the called GDI function into a DDI function and outputs this DDI function to the dispatcher 301, and the dispatcher 301 transfers the contents to the printer driver 203).

Step Drv6. The printer driver 203 converts bitmap drawing into a PDL command.

Step D6. The despooler 305 notifies the graphic engine 202 via a GDI function that the page printing is completed (the graphic engine 202 converts the notified GDI function into a DDI function and outputs this DDI function to the dispatcher 301, and the dispatcher 301 transfers the contents to the printer driver 203).

Step Drv4. The printer driver 203 generates a PDL code for page end control.

Step D7. The despooler 305 notifies the graphic engine 202 via a GDI function that the print job is to be completed (the graphic engine 202 converts the notified GDI function into a DDI function and outputs this DDI function to the dispatcher 301, and the dispatcher 301 transfers the contents to the printer driver 203).

Step Drv5. The printer driver 203 generates a PDL command for job end control.

Next, a possible operation as a printing process in which bitmap replacement is performed during spooling in accordance with the processing shown in FIG. 12 will be described below with reference to FIG. 14. Referring to FIG. 14, the same reference numerals as in FIG. 13 denote the same processes, and a repetitive explanation thereof will be omitted.

Processes in steps A1 to S2 are the same as in FIG. 13.

Step A3'. The application 201 uses Unicode to request character drawing which cannot be expressed by ShiftJIS.

Step G1'. Since Unicode cannot be used in the OS, the graphic engine 202 looks up a glyph index table corresponding to a font of the character designated by Unicode, and transfers to the printer driver 203 a glyph index corresponding to the designated character code (Unicode) as a character code of character drawing.

After that, steps S3 to Drv5 are the same as in FIG. 13.

In the processing explained with reference to FIGS. 13 and 14, even if the printer driver 203 requests a glyph of an embedded font (which is not originally present), no font replacement by the graphic engine occurs. Basically, therefore, a character output having a shape intended by the user is obtained. However, the conversion from character drawing into bitmap drawing has the following problems.

1. Deterioration of Quality Upon Enlargement

As indicated in the middle right row in FIG. 7, the quality of a character deteriorates if enlargement is performed after spooling.

2. Problem of Color Processing

Information concerning character drawing disappears when the data is converted into a bitmap. Therefore, color processing of character drawing cannot be applied to color conversion performed during color printing.

3. Problem of Compression

A compression process effective to a bitmap of a character glyph cannot be applied.

As described above, the conventional printing control apparatus includes a spooler, despooler, and printer driver. Before printing data to be transmitted to a printer is generated, the spooler temporarily saves data in a data format (a so-called intermediate code) different from the printing data to be finally transmitted to the printer. From this data temporarily saved in the intermediate code format, the despooler generates the printing data to be finally transmitted to the printer. The printer driver generates printer control commands. When character drawing using an embedded font is to be performed in this printing control apparatus, font replacement or bitmap replacement occurs. When the font replacement occurs, no intended output result can be obtained. When the bitmap replacement occurs, the printing quality lowers, and problems arise in color processing and in a compression process.

Also, when a code (glyph index) which identifies a font-dependent code is used instead of a character code, the character may be garbled if font replacement occurs in the despooler. Additionally, a font-dependent glyph index is not a character code and hence cannot be converted into a character code usable by a built-in font of the printer. Therefore, a process of replacement to a built-in font of the printer cannot be applied.

SUMMARY OF THE INVENTION

It is an object of the present invention to solve the above conventional problems and provide a printing control apparatus and printing control method in which a printing instruction is once converted into an intermediate code format and then converted into a control command, and which can correctly print an embedded font.

It is another object of the present invention to provide a printing control apparatus and printing control method in which a printing instruction is once converted into an intermediate code format and then converted into a control command, and which can print data without any garbled characters even if an application designates a character code of a system which cannot be processed as a character code in the printing control apparatus.

According to an aspect of the present invention, a printing control apparatus for converting a printing instruction from an application into a control command suited to a predetermined printing apparatus, and outputting the control command, comprising: intermediate data generating means for converting the printing instruction into intermediate data having a format different from the control command, and storing the intermediate data; and control command generating means for converting the intermediate data into the control command and outputting the control command, wherein said intermediate data generating means comprises: font determining means for determining whether en embedded font is contained in the printing instruction; and storage means for, when it is determined that the embedded font is contained, acquiring the embedded font and storing the embedded font together with the intermediate data, and said control command generating means converts the intermediate data into the control command by using the embedded font stored together with the intermediate data.

According to another aspect of the present invention, a printing control method of converting a printing instruction from an application into a control command suited to a predetermined printing apparatus, and outputting the control command, comprising: the intermediate data generation step of converting the printing instruction into intermediate data having a format different from the control command, and storing the intermediate data; and the control command generation step of converting the intermediate data into the control command and outputting the control command, wherein the intermediate data generation step comprises: the font determination step of determining whether an embedded font is contained in the printing instruction; and the storage step of, when it is determined that the embedded font is contained, acquiring the embedded font and storing the embedded font together with the intermediate data, and in the control command generation step, the intermediate data is converted into the control command by using the embedded font stored together with the intermediate data.

According to a further aspect of the present invention, a printing control apparatus comprising: spooler which, if a font is an embedded font when information representing character drawing is to be written as an intermediate code, requests acquisition of the font, and stores the acquired font as intermediate data into a spool file; a despooler which registers the font embedded in the spool file; and a driver which acquires a character glyph on the basis of the font registered by said despooler, and converts information representing the character drawing into a PDL.

According to still further aspect of the present invention, a printing control method comprising: the storage step of, if a font is an embedded font when information representing character drawing is to be written as an intermediate code, requesting acquisition of the font, and storing the acquired font as intermediate data into a spool file; the registration step of registering the font embedded in the spool file; and the conversion step of acquiring a character glyph on the basis of the registered font, and converting information representing the character drawing into a PDL.

According to another aspect of the present invention, a computer program comprising: a program of the storage step of, if a font is an embedded font when information representing character drawing is to be written as an intermediate code, requesting acquisition of the font, and storing the acquired font as intermediate data into a spool file; a program of the registration step of registering the font embedded in the spool file; and a program of the conversion step of acquiring a character glyph on the basis of the registered font, and converting information representing the character drawing into a PDL.

According to another aspect of the present invention, a computer-readable storage medium storing:

a program of the storage step of, if a font is an embedded font when information representing character drawing is to be written as an intermediate code, requesting acquisition of the font, and storing the acquired font as intermediate data into a spool file;

a program of the registration step of registering the font embedded in the spool file; and a program of the conversion step of acquiring a character glyph on the basis of the registered font, and converting information representing the character drawing into a PDL.

According to another aspect of the present invention, a printing control apparatus for converting a printing instruction from an application into a control command suited to a predetermined printing apparatus, and outputting the control command, comprising: data converting means for converting the printing instruction into a first data format containing a character code or glyph index; intermediate data generating means for converting the printing instruction having a first data format into intermediate data having a format different from the control command, and storing the intermediate data; and control command generating means for converting the intermediate data into the control command and outputting the control command, wherein said intermediate data generating means comprises character code acquiring means for, if the printing instruction having the first data format contains the glyph index, acquiring a character code corresponding to the glyph index, and generates the intermediate code by using the character code contained in the printing instruction having the first data format, or the character code acquired by said character code acquiring means.

According to another aspect of the present invention, a printing control method of converting a printing instruction from an application into a control command suited to a predetermined printing apparatus, and outputting the control command, comprising: the data conversion step of converting the printing instruction into a first data format containing a character code or glyph index; the intermediate data generation step of converting the printing instruction having a first data format into intermediate data having a format different from the control command, and storing the intermediate data; and the control command generation step of converting the intermediate data into the control command and outputting the control command, wherein the intermediate data generation step comprises the character code acquisition step of, if the printing instruction having the first data format contains the glyph index, acquiring a character code corresponding to the glyph index, and the intermediate code is generated by using the character code contained in the printing instruction having the first data format, or the character code acquired in the character code acquisition step.

According to another aspect of the present invention, a printing control apparatus comprising: a spooler which acquires a glyph index, converts the acquired glyph index into a character code, and spools character drawing information by an intermediate data format by using the converted character code; and a driver which acquires a glyph index corresponding to the character code contained in a character drawing instruction spooled by said spooler, and acquires a character glyph by using the acquired glyph index.

According to another aspect of the present invention, a printing control method comprising the steps of: acquiring a glyph index; converting the acquired glyph index into a character code; spooling character drawing information by an intermediate data format by using the converted character code; acquiring a glyph index corresponding to the character code contained in a spooled character drawing instruction; and acquiring a character glyph by using the acquired glyph index.

According to another aspect of the present invention, a computer program comprising programs of the steps of: acquiring a glyph index; converting the acquired glyph index into a character code; spooling character drawing information by an intermediate data format by using the converted character code; acquiring a glyph index corresponding to the character code contained in a spooled character drawing instruction; and acquiring a character glyph by using the acquired glyph index.

According to another aspect of the present invention, a computer-readable storage medium storing programs of the steps of: acquiring a glyph index; converting the acquired glyph index into a character code; spooling character drawing information by an intermediate data format by using the converted character code; acquiring a glyph index corresponding to the character code contained in a spooled character drawing instruction; and acquiring a character glyph by using the acquired glyph index.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view for explaining information necessary for character drawing and printing results;

FIG. 6 is a view for explaining other examples of information necessary for character drawing and printing results;

FIG. 8 is a view showing examples of glyph index tables;

DETAILED DESCRIPTION OF THE PREFERRED EMBODIMENTS

Preferred embodiments of the present invention will now be described in detail in accordance with the accompanying drawings.

First Embodiment

Before an explanation of a printing control apparatus according to an embodiment of the present invention, the arrangement of a printing apparatus controllable by a printing control apparatus of an embodiment of the present invention will be explained.

(Structure of Printer)

Figure 1:
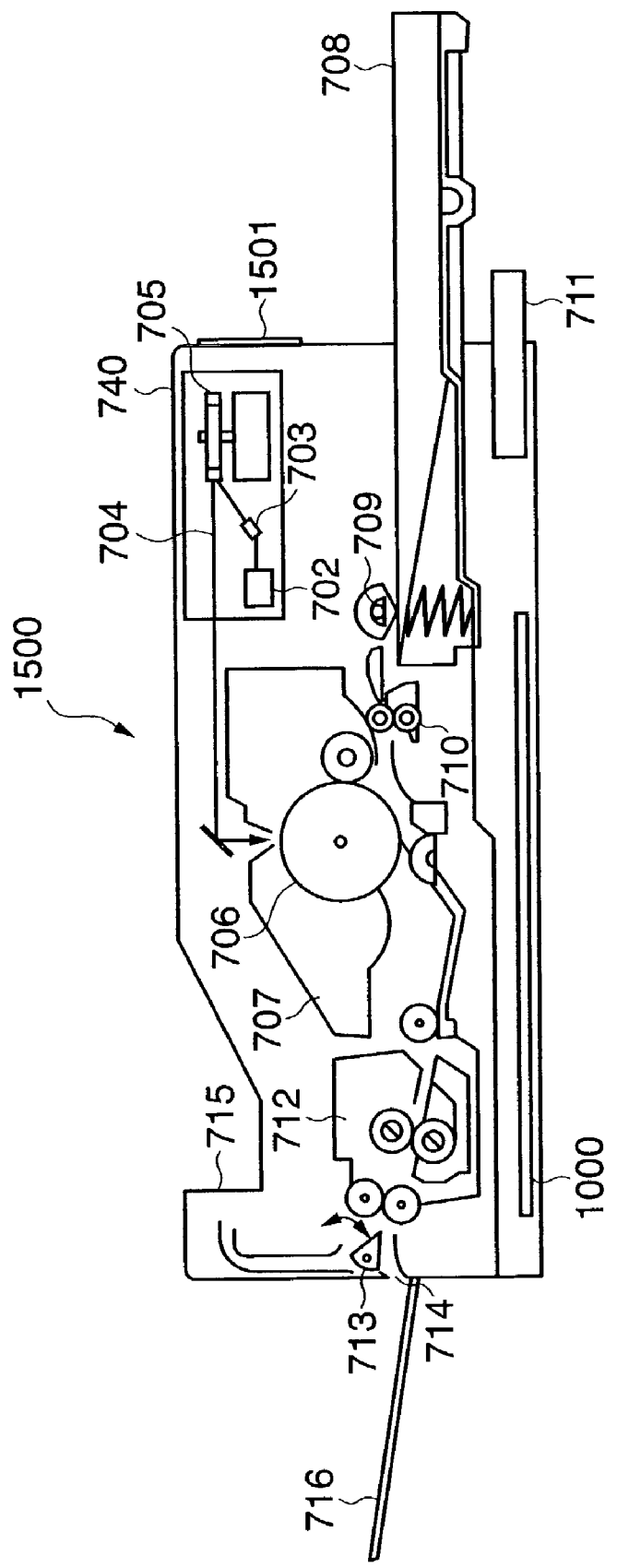
FIG. 1 is a sectional view showing the arrangement of a laser beam printer as an example of a printer to which a printing control apparatus of the present invention can be connected.

FIG. 1 is a schematic sectional view for explaining the arrangement of a printing apparatus controllable by a printing control apparatus according to an embodiment of the present invention. In this embodiment, a printing apparatus 1500 is, e.g., a laser beam printer. However, it is of course also possible to use an inkjet printer or a printing apparatus using some other printing system.

This printing apparatus (to be referred to as a printer hereinafter) 1500 forms an image on a printing sheet as an example of a printing medium, on the basis of, e.g., a printer control command supplied from a printing control apparatus directly or across a network or the like. A printer body 740 includes a printer control unit 1000, an operation unit 1501, a laser driver 702, a semiconductor laser 703, a rotary polyhedral mirror 705, an electrostatic drum 706, a developing unit 707, a paper cassette 708, conveyor rollers 710, an external memory 711, a face-down discharge unit 715, and a paper delivery tray 716.

Each component and its operation will be described in detail below. The printer control unit 1000 controls the whole printer body 740. This printer control unit 1000 primarily converts printer control commands into video signals and outputs the signals to the laser driver 702. The external memory 711 which supplies font data, an emulation program of a page description language (PDL), and the like can be connected to the printer control unit 1000. The operation unit 1501 has keys, a display means (e.g., an LED display), and the like for operating and setting the printer 1500.

The laser driver 702 is a circuit for driving the semiconductor laser 703. In accordance with an input video signal, the laser driver 702 drives the semiconductor laser 703 and turns on and off a laser beam 704 emitted from the semiconductor laser 703. The semiconductor laser 703 emits a laser beam toward the rotary polyhedral mirror 705. The rotary polyhedral mirror 705 reflects the laser beam 704 in the horizontal direction to allow this laser beam 704 to scan the electrostatic drum 706. When this electrostatic drum 706 charged to a predetermined potential beforehand is scanned by the laser beam 704 which is turned on and off, an electrostatic latent image corresponding to the output video signal from the printer control unit 1000 is formed on the drum surface. The developing unit 707 is placed near the electrostatic drum 706 and develops (visualizes) the electrostatic latent image by using a developing agent (toner).

The paper cassette 708 contains, e.g., cut sheets as printing sheets. A paper feed roller 709 and the conveyor rollers 710 convey a cut printing sheet in the paper feed cassette 708 into the printer body 740, and supply the sheet to a position where the sheet opposes the electrostatic drum 706. A printing sheet can be supplied not only from the paper cassette 708 but also from a manual feed tray (not shown) on the upper surface of a lid of the paper cassette 708. The latent image (toner image) developed on the drum is transferred onto the printing sheet conveyed by a transfer roller and the like.

A fixing unit 712 gives heat and pressure to the toner image transferred to the cut printing sheet, thereby fixing this toner image on the cut printing sheet. When a switching wedge 713 is pointed up, the printing sheet having the image formed on it is discharged from a face-up discharge unit 714 to the paper delivery tray 716 with the image bearing surface facing up. When this switching wedge 713 is pointed down, the printing sheet is discharged from the face-down discharge unit 715 with the image bearing surface facing down.

(Arrangement of Printing Control Apparatus)

The arrangement of a host computer as an example of a printing control apparatus according to an embodiment of the present invention will be described below with reference to a block diagram in FIG. 2. Note that this printing control apparatus can be any of a single apparatus, a system made up of a plurality of apparatuses, and a system which operates as it is connected across a network such as a LAN (Local Area Network) or WAN (Wide Area Network), provided that the functions of the printing control apparatus explained below are implemented.

Figure 2:
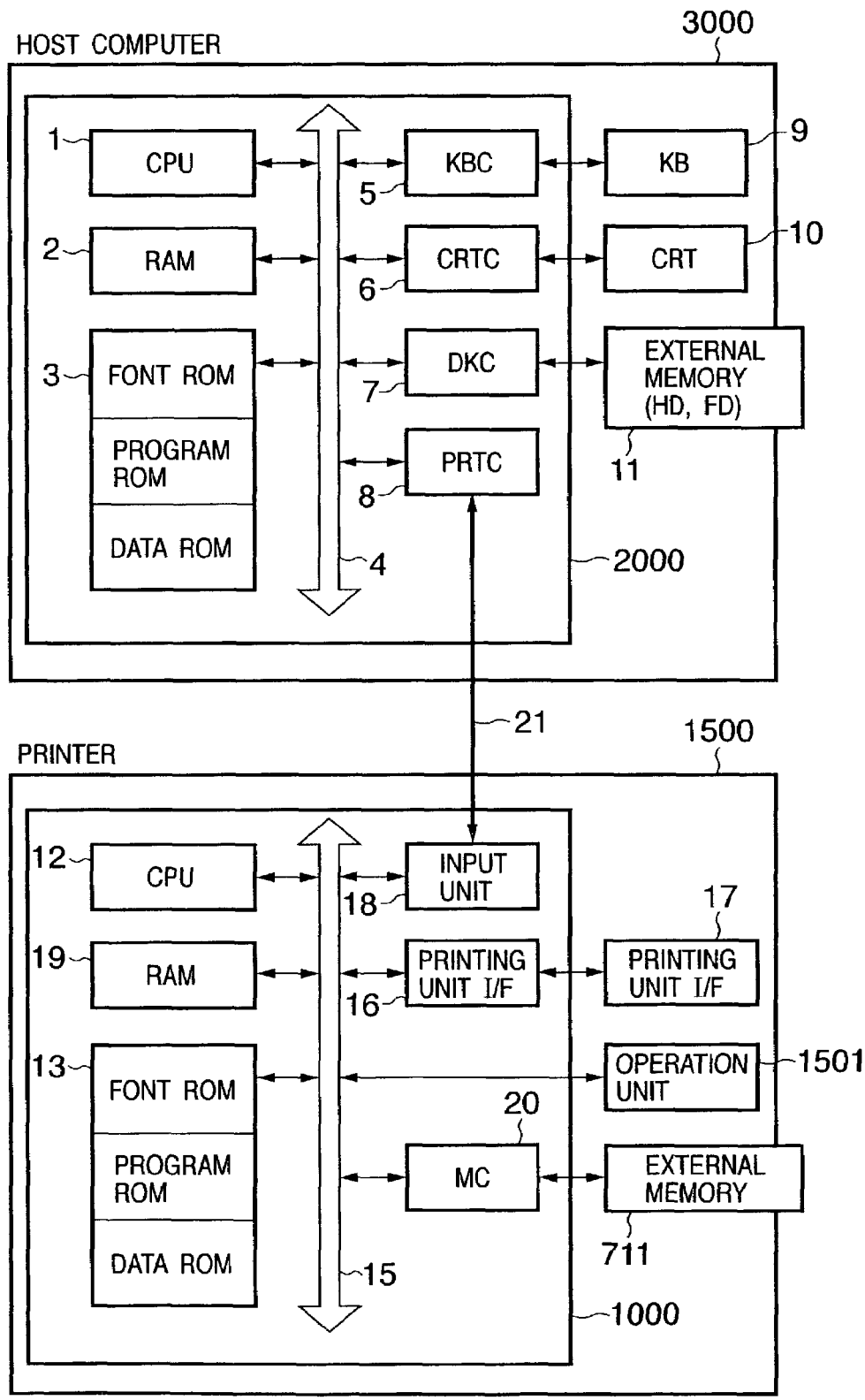
FIG. 2 is a block diagram showing the hardware configurations of a host computer as a printing control apparatus according to an embodiment of the present invention, and a printer connected to the host computer.
Figure 3:
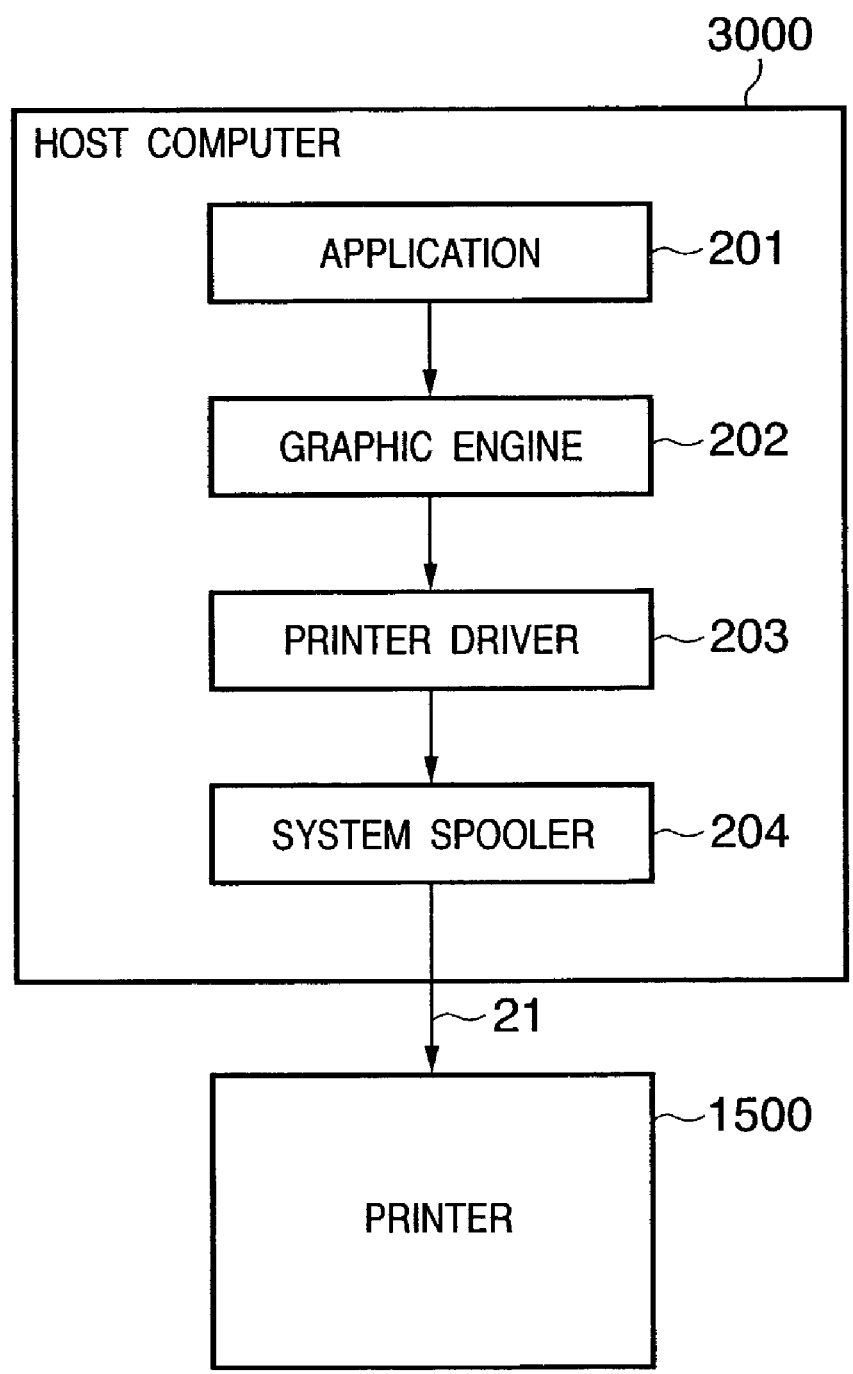
FIG. 3 is a representative functional block diagram of a conventional printing control apparatus in which a printing instruction from an application is converted into a printer control command without being converted into intermediate code data.

Referring to FIG. 2, a host computer 3000 as an example of the printing control apparatus according to an embodiment of the present invention is connected to the printer 1500 to configure a printing system. This host computer 3000 includes a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11.

First, each component of the host computer 3000 will be explained below. The CPU 1 is a central processing unit which generally controls individual devices connected to a system bus. On the basis of an application program such as a document processing program stored in a program ROM 3b (to be described later) of the ROM 3 or in the external memory 11, the CPU 1 processes a document containing graphics, images, characters, tables (including spreadsheets), and the like. Also, the CPU 1 rasterizes an outline font into, e.g., a display information RAM set on the RAM 2, thereby enabling WYSIWYG (What You See Is What You Get: a function capable of printing an image with the size and shape shown on the CRT display screen) on the CRT display 10.

Furthermore, on the basis of commands designated by, e.g., a mouse cursor (not shown) on the CRT display 10, the CPU 1 opens various registered windows and executes various data processing. When printing data by using the printer 1500, the user can open a window concerning settings of printing and set a printing method, including settings of the printer 1500 and selection of a printing mode, with respect to the printer driver.

The RAM 2 functions as a main memory, work area, and the like of the CPU 1. The ROM 3 includes a font ROM 3a, the program ROM 3b, and a data ROM 3c. The font ROM 3a or the external memory 11 stores, e.g., font data for use in the document processing described above. The program ROM 3b or the external memory 11 stores, e.g., an operating system (to be referred to as an OS hereinafter) which is a control program of the CPU 1. The data ROM 3c or the external memory 11 stores various data used when the document processing and the like are performed.

The keyboard controller (KBC) 5 controls key inputs from the keyboard 9 and a pointing device (not shown). The CRT controller (CRTC) 6 controls a display on the CRT display (CRT) 10. The disk controller (DKC) 7 controls access to the external memory 11. The printer controller (PRTC) 8 is connected to the printer 1500 via a bidirectional interface 21 and controls communication with the printer 1500. The keyboard 9 has various keys.

The CRT display (CRT) 10 displays graphics, image characters, tables, and the like. The external memory 11 is, e.g., a hard disk (HD) or a floppy disk (FD), and stores a boot program, various applications, font data, user files, edit files, a printer control command generation program (to be referred to as a printer driver hereinafter), and the like.

The CPU 1, the RAM 2, the ROM 3, the keyboard controller (KBC) 5, the CRT controller (CRTC) 6, the disk controller (DKC) 7, and the printer controller (PRTC) 8 described above are arranged on a computer control unit 2000.

The host computer 3000 like this can be implemented by, e.g., a general-purpose personal computer having the interface 21 connectable to the printer 1500.

Next, each component of the printer 1500 will be explained in detail below. A CPU 12 is a central processing unit for generally controlling individual devices connected to a system bus 15. On the basis a control program stored in a program ROM 13b (to be described later) of a ROM 13 or in an external memory 14, the CPU 12 outputs an image signal as output information to a printing unit (printer engine) 17. Also, this CPU 12 can communicate with the host computer 3000 via an input unit 18 and notify the host computer 3000 of internal information of the printer 1500.

A RAM 19 functions as a main memory, work area, and the like of the CPU 12. The memory capacity of this RAM 19 can be extended by an optional RAM (not shown) connected to an expansion port. Note that the RAM 19 is used as, e.g., an output information rasterization area, environmental data storage area, and NVRAM. The ROM 13 includes a font ROM 13a, the program ROM 13, and a data ROM 13c. The font ROM 13a stores, e.g., font data used when the output information is to be generated. The program ROM 13b stores a control program of the CPU 12 and the like. The data ROM 13c stores, e.g., information used on the host computer 3000 if the external memory 711 such as a hard disk is not connected to the printer 1500.

The input unit 18 exchanges data between the printer 1500 and the host computer 3000 via the bidirectional interface 21. A printing unit interface (I/F) 16 exchanges data between the CPU 12 and the printing unit 17. A memory controller (MC) 20 controls access to the external memory 711. The printing unit 17 performs printing under the control of the CPU 12. The operation unit 1501 includes, e.g., switches and a display means (e.g., an LED display) for various operations.

The external memory 711 is a hard disk (HD), an IC card, or the like and connected as an optional device to the printer 1500. This external memory 711 stores font data, an emulation program, form data, and the like. Access to the external memory 711 is controlled by the memory controller (MC) 20. Note that a plurality of external memories 711 can also be included. That is, in addition to a built-in font, a plurality of optional cards and external memories storing programs for interpreting printer control languages different in language system can be connected. Furthermore, an NVRAM (not shown) can be used to store printer mode setting information from the operation unit 1501.

The CPU 12, the RAM 19, the ROM 13, the input unit 18, the printing unit interface (I/F) 16, and the memory controller (MC) 20 described above are arranged on the printer control unit 1000.

(Functional Configuration of Printing Control Apparatus)

Figure 4:
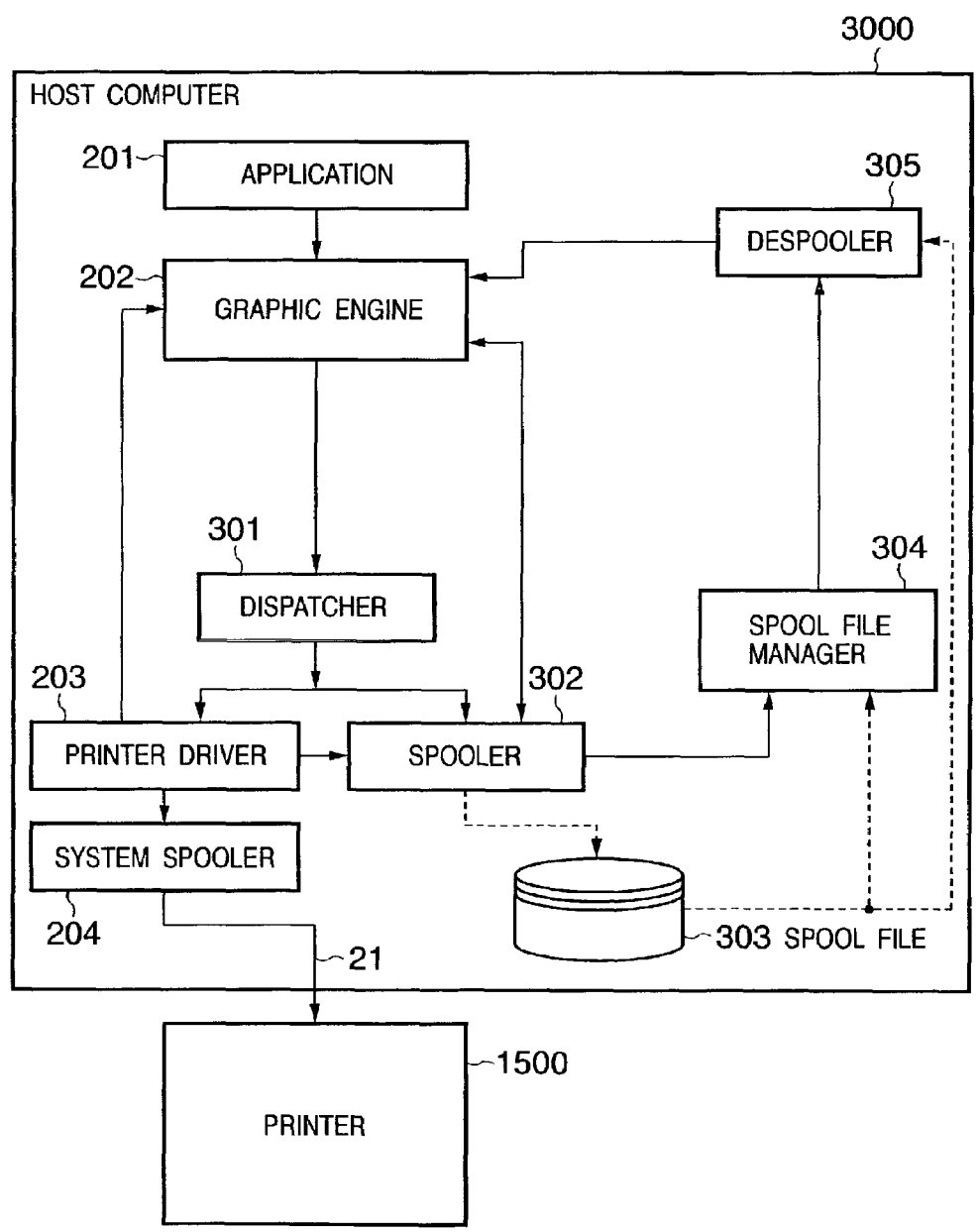
FIG. 4 is a representative functional block diagram of a printing control apparatus, applicable to a printing control apparatus of the present invention, in which a printing instruction from an application is converted into intermediate code data and then converted into a printer control command.
Figure 7:
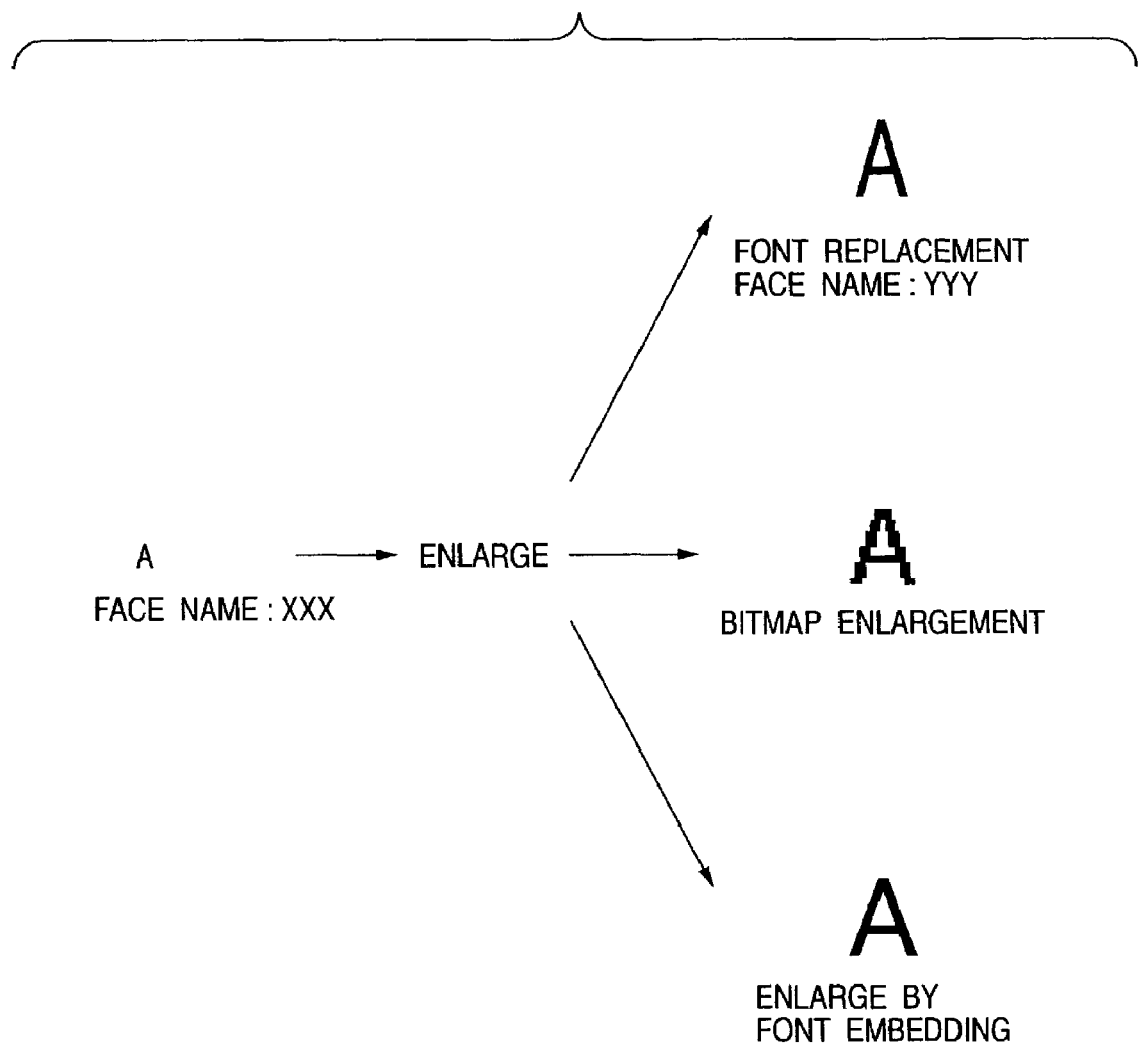
FIG. 7 is a view showing examples of printing results when font replacement and bitmap replacement occur in character drawing.
Figure 9:
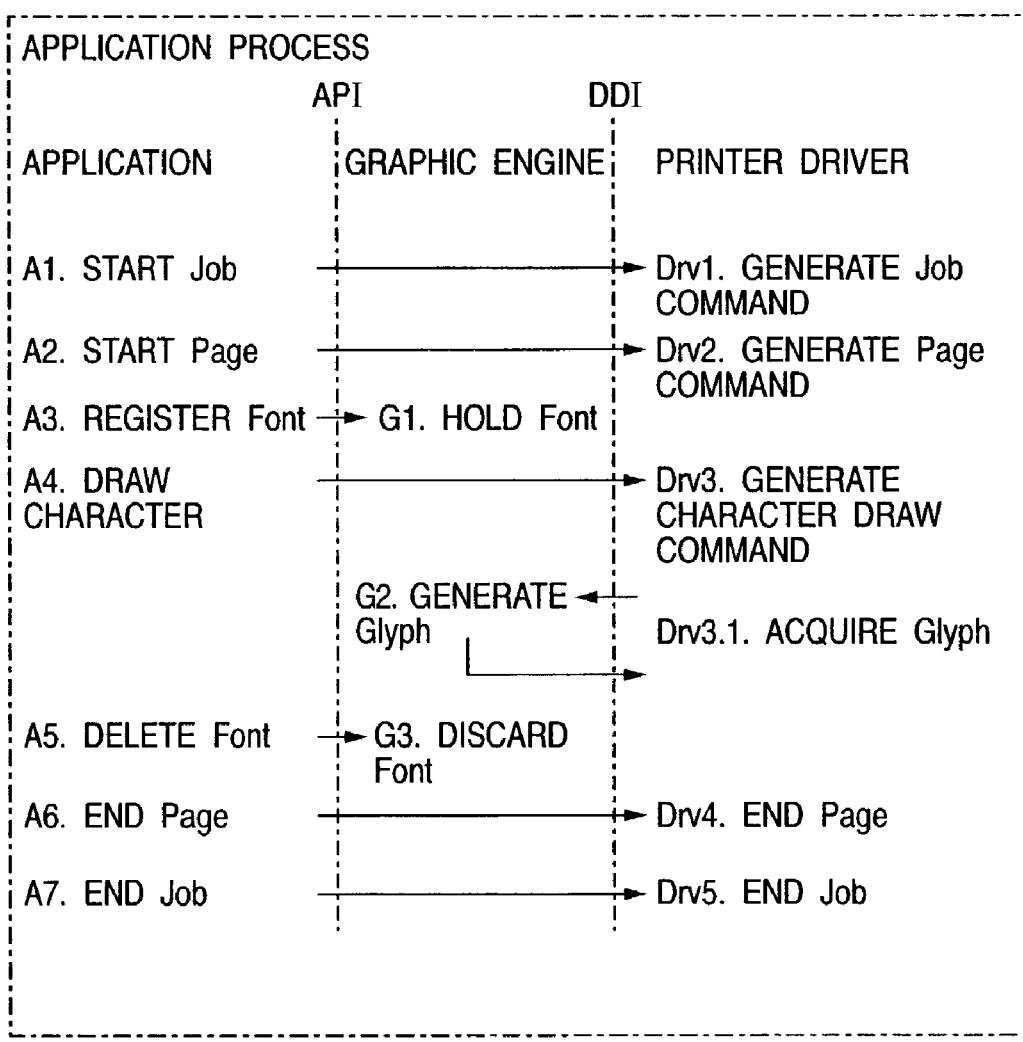
FIG. 9 is a view showing a sequence of a printing process in the printing control apparatus shown in FIG. 3.
Figure 10:
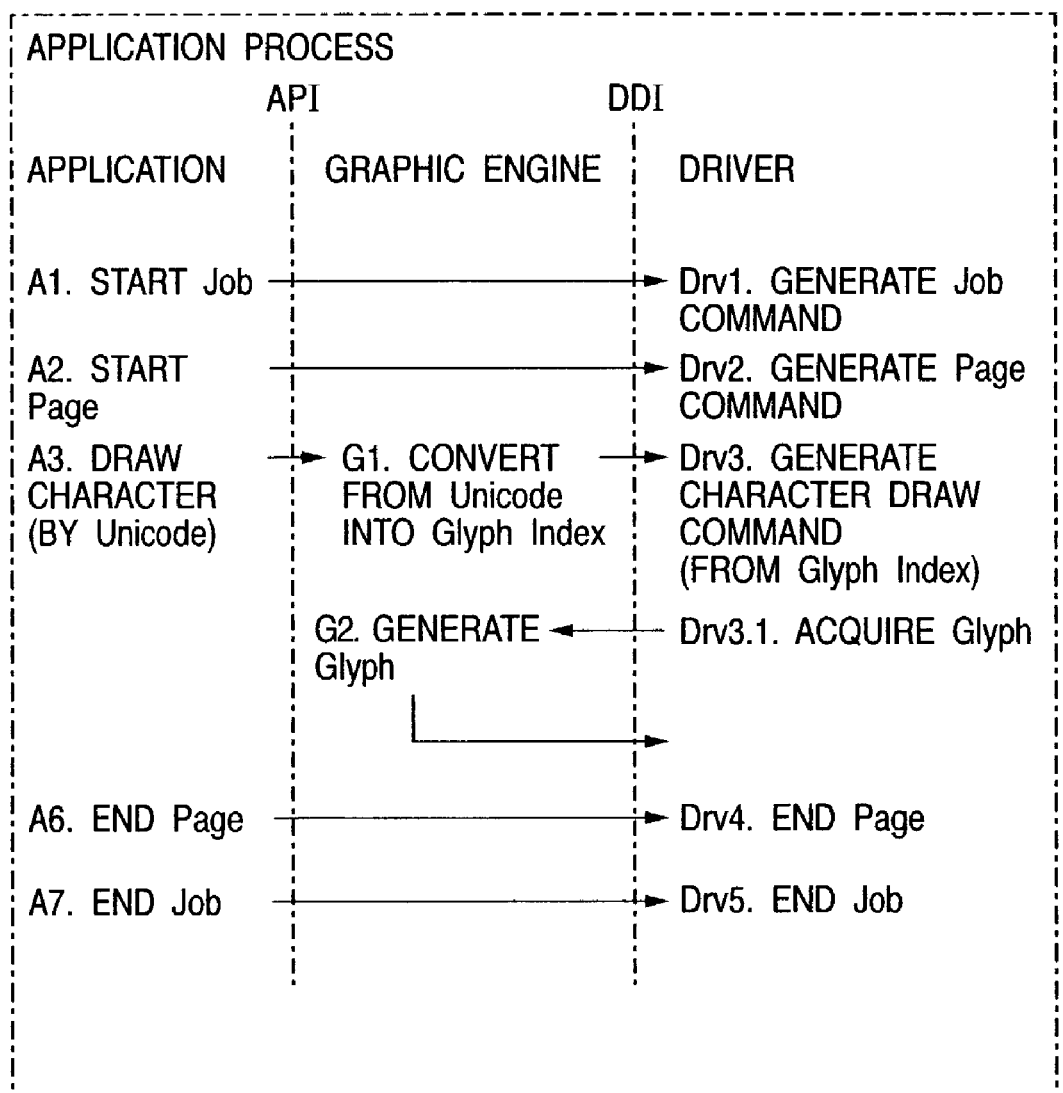
FIG. 10 is a view showing another sequence of the printing process in the printing control apparatus shown in FIG. 3.

The functional configuration of the host computer 3000 as a printing control apparatus of the present invention can be the same as the configuration shown in FIG. 4 described above, so a repetitive explanation thereof will be omitted.

Note that in this embodiment, an application 201, a graphic engine 202, a dispatcher 301, a printer driver 203, a spooler 302, a spool file manager 304, a despooler 305, and a system spooler 204 shown in FIG. 4 are program modules present as files saved in the external memory 11 shown in FIG. 2 and executed as they are loaded into the RAM 2 by the OS or by modules which use these program modules.

Note also that the application 201 and the printer driver 203 can be added to an FD or CD-ROM as the external memory 11 or to an HD as the external memory 11 across a network (not shown). The application 201 saved in the external memory 11 is executed as it is loaded into the RAM 2. When this application 201 is to perform printing with respect to the printer 1500, the application 201 outputs (draws) data by using the graphic engine 202 which is similarly executable as it is loaded into the RAM 2.

The graphic engine 202 loads the printer driver 203 prepared for each printing apparatus (printer) from the external memory 11 into the RAM 2, generates a printing instruction (DDI function) from an output (GDI function) of the application 201, and outputs this DDI function to the dispatcher 301.

The dispatcher 301 receives the printing instruction from the graphic engine 202. If this printing instruction received from the graphic engine 202 is issued from the application 201 to the graphic engine 202, the dispatcher 301 loads the spooler 302 stored in the external memory 11 into the RAM 2, and transfers the printing instruction to the spooler 302, not to the printer driver 203.

The spooler 302 converts the received printing instruction into an intermediate code and outputs this intermediate code to a spool file 303. Also, the spooler 302 acquires, from the printer driver 203, process settings concerning printing data set for the printer driver 203, and saves the acquired process settings in the spool file 303. Although this spool file 303 is generated as a file on the external memory 11, the spool file 303 can also be generated on the RAM 2. In addition, the spooler 302 loads the spool file manager 304 stored in the external memory 11 into the RAM 2, and notifies this spool file manager 304 of the generation status of the spool file 303.

After that, the spool file manager 304 checks whether printing can be performed in accordance with the contents of the process settings concerning the printing data saved in the spool file 303. If determining that printing can be performed by using the graphic engine 202, the spool file manager 304 loads the despooler 305 stored in the external memory 11 into the RAM 2, and instructs the despooler 305 to print the intermediate code described in the spool file 303.

The despooler 305 processes the intermediate code contained in the spool file 303 in accordance with the contents of the process settings contained in the spool file 303, and outputs the result to the graphic engine 202. The graphic engine 202 generates a printing instruction (DDI function) from the output (GDI function) of the despooler 305, and outputs this printing instruction to the dispatcher 301. If the printing instruction received from the graphic engine 202 is issued from the despooler 305 to the graphic engine 202, the dispatcher 301 transfers this printing instruction to the printer driver 203, not to the spooler 302. The printer driver 203 generates a printer control command and outputs the command to the printer 1500 via the system spooler 204.

(Processing of Printing Data Having Embedded Font)

Figure 11:
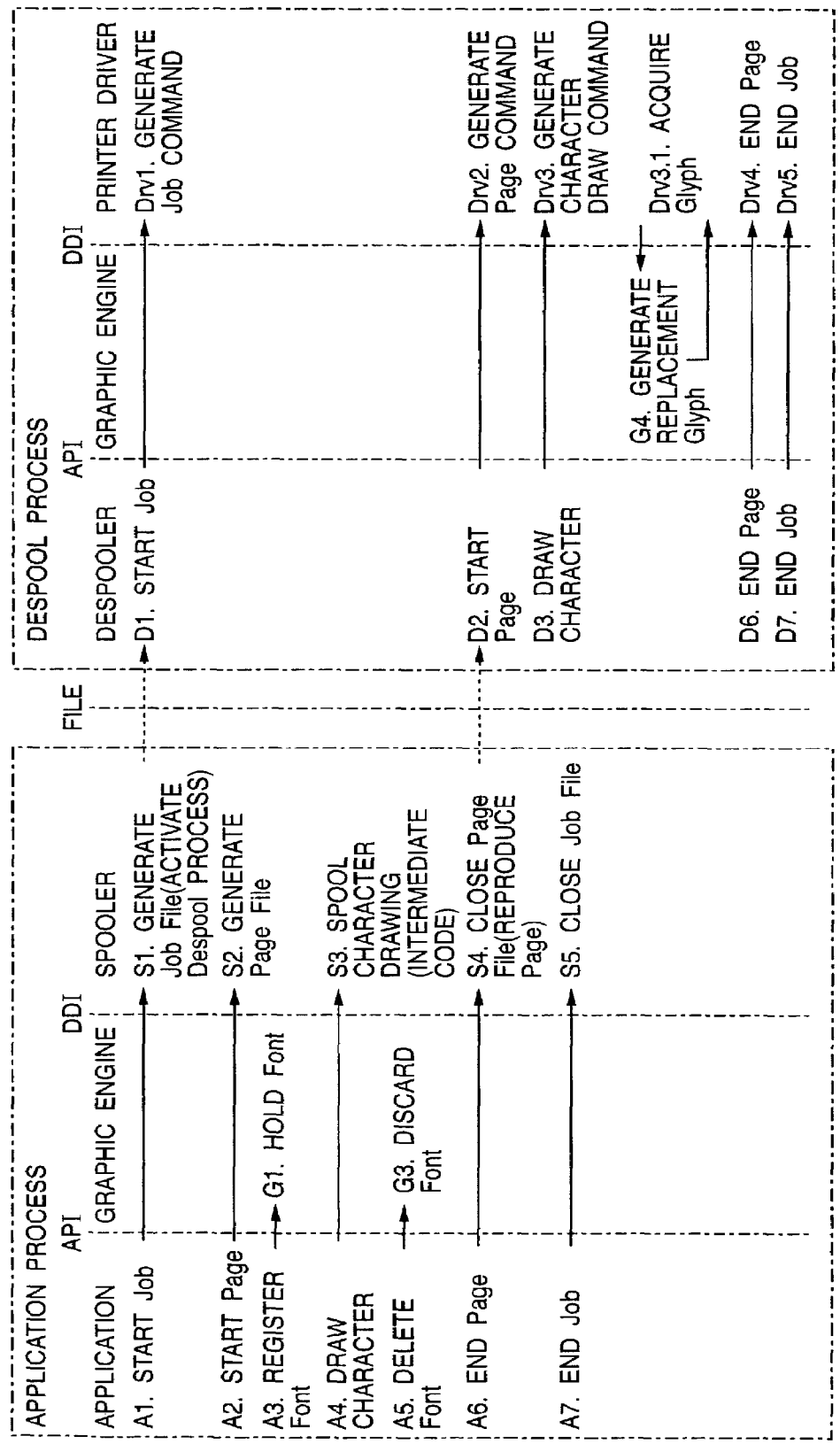
FIG. 11 is a view showing a sequence when font replacement occurs, as a printing process in the printing control apparatus shown in FIG. 4.
Figure 12:
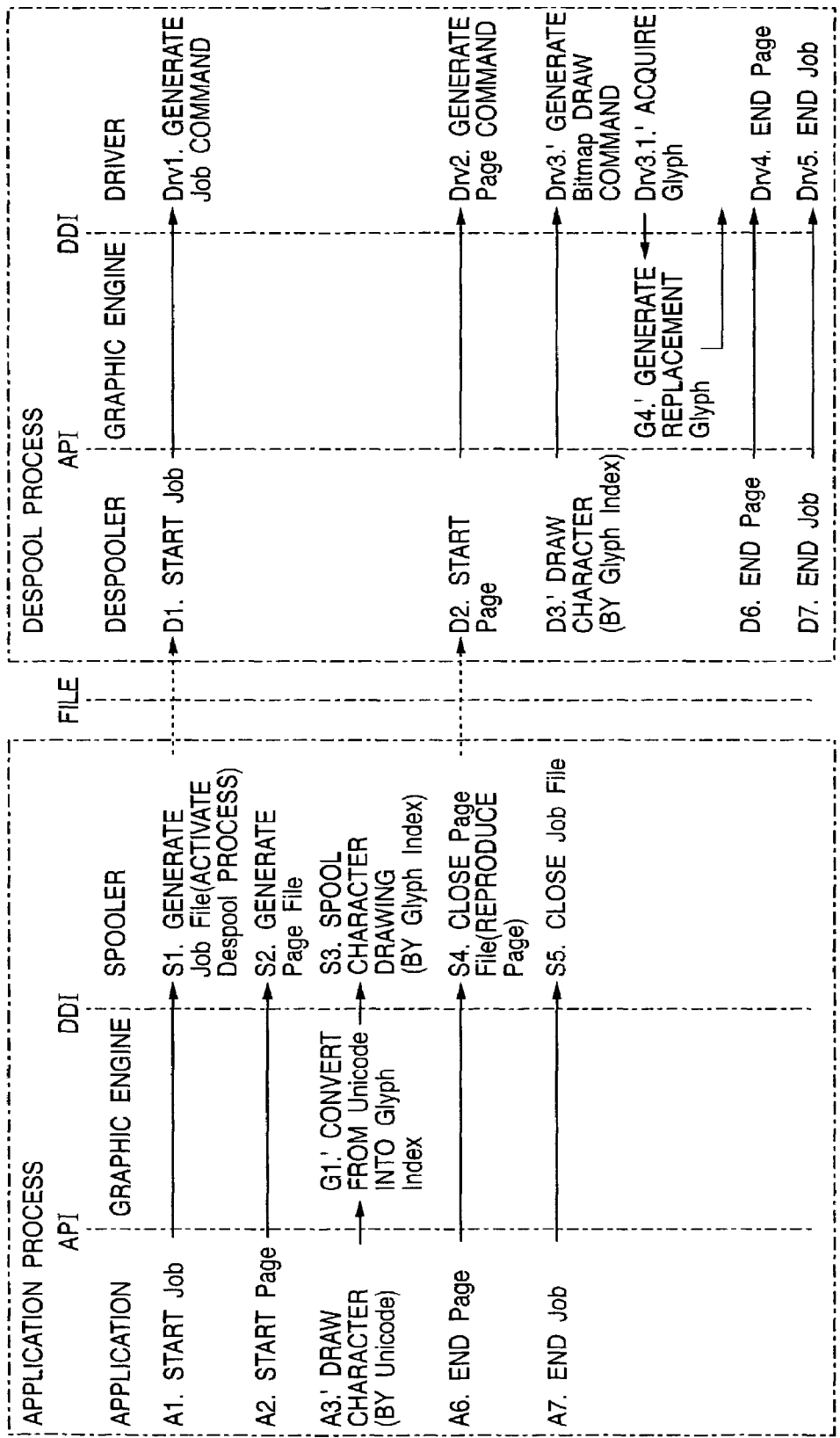
FIG. 12 is a view showing another sequence when font replacement occurs, as a printing process in the printing control apparatus shown in FIG. 4.

Processing of printing data having an embedded font performed in the host computer 3000 of this embodiment will be described below with reference to a sequence chart in FIG. 15. Similar to FIG. 11, this processing cannot be done by a single process. To control a plurality of jobs, queue processing between an application process and a despooler process must be realized. In practice, communication between these two processes is performed via the spool file manager 304. To simplify the explanation, however, the spool file manager 304 including the queue processing is regarded as one communication medium and omitted from FIG. 15 and from the following explanation.

Step A1. The application 201 notifies the graphic engine 202 via a GDI function that a print job is to be started (the graphic engine 202 converts the notified GDI function into a DDT function and outputs this DDI function to the dispatcher 301, and the dispatcher 301 transfers the contents to the spooler 302).

Step S1. The spooler 302 generates, in the spool file 303, a job file which holds information, such as a paper size, concerning the job, and activates the despooler 305 as another process.

Step D1. The despooler 305 reads the job file and calls a GDI function for starting the print job (the graphic engine 202 converts the notified GDI function into a DDI function and outputs this DDI function to the dispatcher 301, and the dispatcher 301 transfers the contents to the printer driver 203).

Step Drv1. The printer driver 203 generates a PDL command for job start control.

Step A2. The application 201 notifies the graphic engine 202 via a GDI function that page printing is to be started (the graphic engine 202 converts the notified GDI function into a DDI function and outputs this DDI function to the dispatcher 301, and the dispatcher 301 transfers the contents to the spooler 302).

Step S2. The spooler 302 generates, in the spool file 303, a page file which holds information concerning a page.

Step A3. The application 201 registers an embedded font in application data into the graphic engine 202. This registration makes it possible to use information of the font essential to character drawing even in this environment.

Step G1. The graphic engine 202 holds the font information.

Step A4. The application 201 performs character drawing by using a font including the font registered in step A3 (the graphic engine 202 converts a GDI function called upon drawing into a DDI function and outputs this DDI function to the dispatcher 301, and the dispatcher 301 transfers the contents to the spooler 302).

Step S3. The spooler 302 writes information representing character drawing as an intermediate code into the page file of the spool file. This intermediate code contains only "character code, font attributes, and drawing attributes" obtainable from the DDI function, and does not contain any font. If the font is an embedded font, the following processing is performed to eliminate the difference between drawn characters resulting from font replacement.

Step S3.3. The spooler 302 checks the graphic engine 202 for the font attributes used in character drawing and, if font acquisition is permitted, calls a GDI function and requests the graphic engine 202 to acquire a font.

By thus calling a GDI function from the spooler 302, font information which cannot be directly acquired from a DDI function can be acquired and spooled.

Step G4. The graphic engine 202 transfers the font to the spooler 302.

Step S3.4. The spooler 302 spools, in an intermediate code format, the font acquired from the graphic engine 202 into the spool file 303.

Step A5. The application 201 deletes the font registered in step A3 from the graphic engine 202.

Step G3. The embedded font held by the graphic engine 202 is discarded.

Step A6. The application 201 notifies the graphic engine 202 via a GDI function that page printing is completed (the graphic engine 202 converts the notified GDI function into a DDI function and outputs this DDI function to the dispatcher 301, and the dispatcher 301 transfers the contents to the spooler 302).

Step S4. The spooler 302 closes the page file and requests the despooler 305 to reproduce the page.

Step A7. The application 201 notifies the graphic engine 202 via a GDI function that the print job is to be completed (the graphic engine 202 converts the notified GDI function into a DDI function and outputs this DDI function to the dispatcher 301, and the dispatcher 301 transfers the contents to the spooler 302).

Step S5. The spooler 302 closes the job file and notifies the despooler 305 that no more pages are present.

Step D2. The despooler 305 calls a GDI function for page start in order to reproduce the intermediate code described in the page file generated in step S2. (the graphic engine 202 converts the notified GDI function into a DDI function and outputs this DDI function to the dispatcher 301, and the dispatcher 301 transfers the contents to the printer driver 203).

Step Drv2. The printer driver 203 generates a PDL command for page start control.

Step D3. If an embedded font is contained in the spool file 303, the despooler 305 changes the identification name (face name) of the embedded font and registers the name in the graphic engine 202. The face name is changed before registration to avoid double registration of this font and the font of the application 201 in step A3. By this registration, a font essential to character drawing can be used even in this environment. In this case, the face name of the font attributes, corresponding the face name, of the intermediate code stored in the spool file is also changed accordingly.

If the face name is changed in accordance with a predetermined rule, a glyph can be acquired by changing the face name in glyph acquisition in step Drv3.1.

Step G1. The graphic engine 202 holds the font information.

Step D4. The despooler 305 calls a GDI function to reproduce character drawing on the page file (the graphic engine 202 converts this GDI function called upon drawing into a DDI function and outputs this DDI function to the dispatcher 301, and the dispatcher 301 transfers the contents to the printer driver 203).

To call a GDI function, the name changed in step D3 is used as the font attribute face name as the identification name of the font. This is realized by temporarily storing, in the RAM 2 or the like, the face name changed in step D3 and the face name before the change and, if the face name before the change is found in face names contained in the intermediate data, converting this face name into the changed face name. However, some other method can also be used.

Step Drv3. The printer driver 203 converts information representing character drawing in the spool file into a PDL command by the following processing.

Step Drv3.1. The printer driver 203 acquires a character glyph from the graphic engine 202. That is, the printer driver 203 transfers to the graphic engine 202 the font attributes (containing the face name) contained in the information representing character drawing.

Step G2. The graphic engine 202 generates a character glyph from the font and transfers the generated glyph to the printer driver 203 via the dispatcher 301. That is, the graphic engine 202 searches for a font having the face name designated in the font attributes contained in the information representing character drawing. Since the font is embedded in the process in step D3, the font can be transferred to the driver. The printer driver 203 acquires the generated character glyph and forms a character drawing command (PDL) for printing the acquired character glyph (character image data).

Step D5. The despooler 305 deletes the font registered in step D3 from the graphic engine 202.

Step G3. The embedded font held by the graphic engine 202 is discarded.

Step D6. The despooler 305 notifies the graphic engine 202 via a GDI function that the page printing is completed (the graphic engine 202 converts the notified GDI function into a DDI function and outputs this DDI function to the dispatcher 301, and the dispatcher 301 transfers the contents to the printer driver 203).

Step Drv4. The printer driver 203 generates a PDL code for page end control.

Step D7. The despooler 305 notifies the graphic engine 202 via a GDI function that the print job is to be completed (the graphic engine 202 converts the notified GDI function into a DDI function and outputs this DDI function to the dispatcher 301, and the dispatcher 301 transfers the contents to the printer driver 203).

Step Drv5. The printer driver 203 generates a PDL command for job end control.

In the printing control apparatus according to this embodiment as described above, when spooling is to be performed, font information which cannot be directly acquired from a DDI function is acquired and spooled by calling a GDI function. In despooling, the spooled font information is registered after the face name as the identification name of a font is changed. By calling a GDI function from the despooler by using the changed face name, printing data containing an embedded font can be correctly output.

Note that the font registered by the despooler has the problem of copyright and hence is always deleted from the printing control apparatus after being used.

In a Japanese font in which vertical writing information and lateral writing information are integrated, information indicating vertical writing is sometimes added to the face name. In this case, this information indicating vertical writing must be remained in the changed face name used in registration by the despooler. The changed face name can be formed by any method. However, it is desirable to use a method which is simple and in which the changed font name is less likely to duplicate a font name before change or a font name originally present in a printing environment. For example, a character of a predetermined number in the face name is replaced with a character which is not usually used in a font name.

Figure 13:
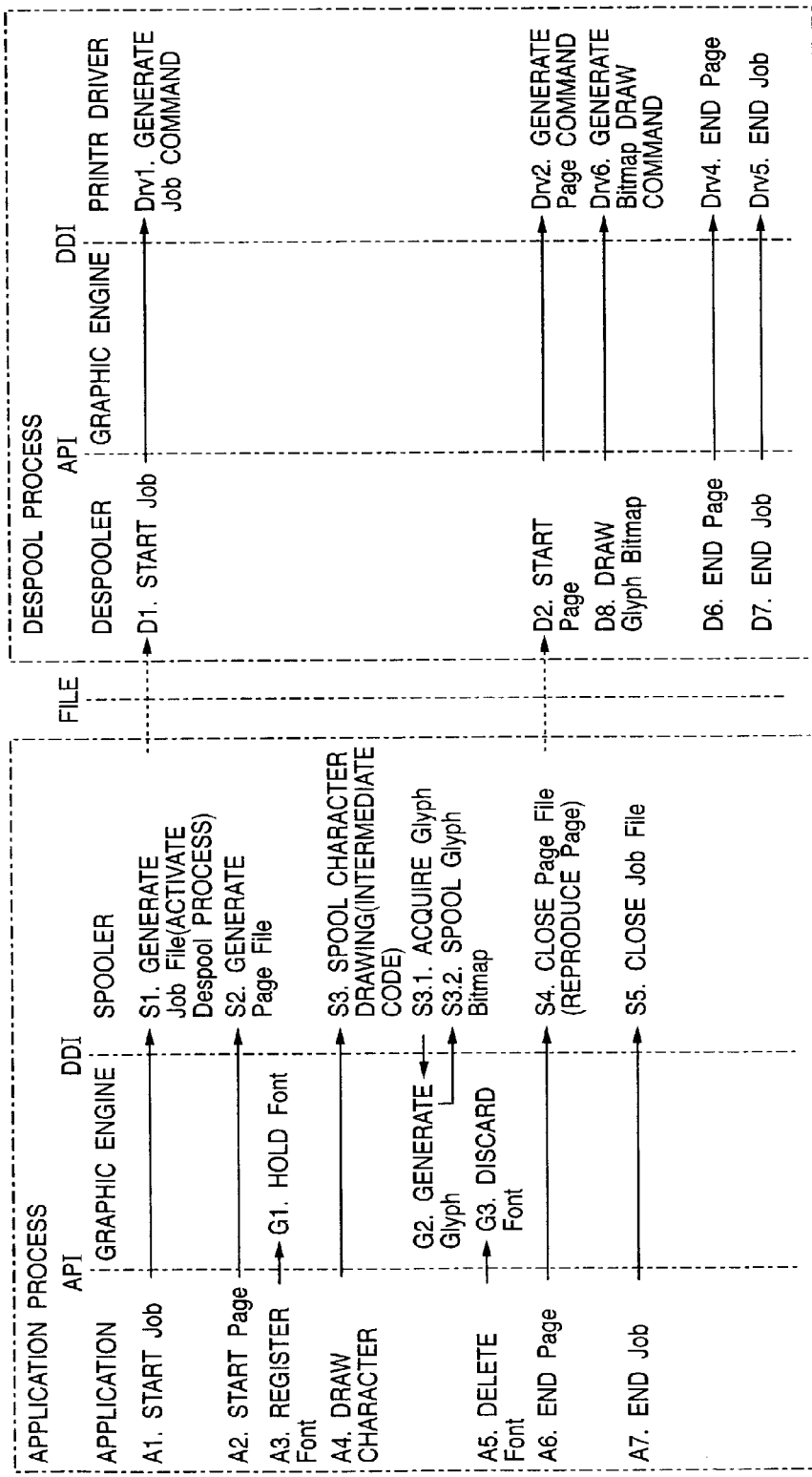
FIG. 13 is a view showing a sequence when bitmap replacement occurs, as a printing process in the printing control apparatus shown in FIG. 4.

Furthermore, some fonts do not permit acquisition of font information of an embedded font. When this is the case, it is possible to detect the font attributes during spooling and perform conversion to conventional font replacement or bitmap drawing as explained in FIGS. 11 and 13.

Second Embodiment

Processing of printing data when a glyph index table must be used in a host computer 3000 described above will be explained below with reference to a sequence chart shown in FIG. 16. Similar to the processing in the first embodiment, this processing cannot be done by a single process. To control a plurality of jobs, queue processing between an application process and a despooler process must be realized. In practice, communication between these two processes is performed via a spool file manager 304. To simplify the explanation, however, the spool file manager 304 including the queue processing is regarded as one communication medium and omitted from FIG. 16 and from the following explanation.

Figure 15:
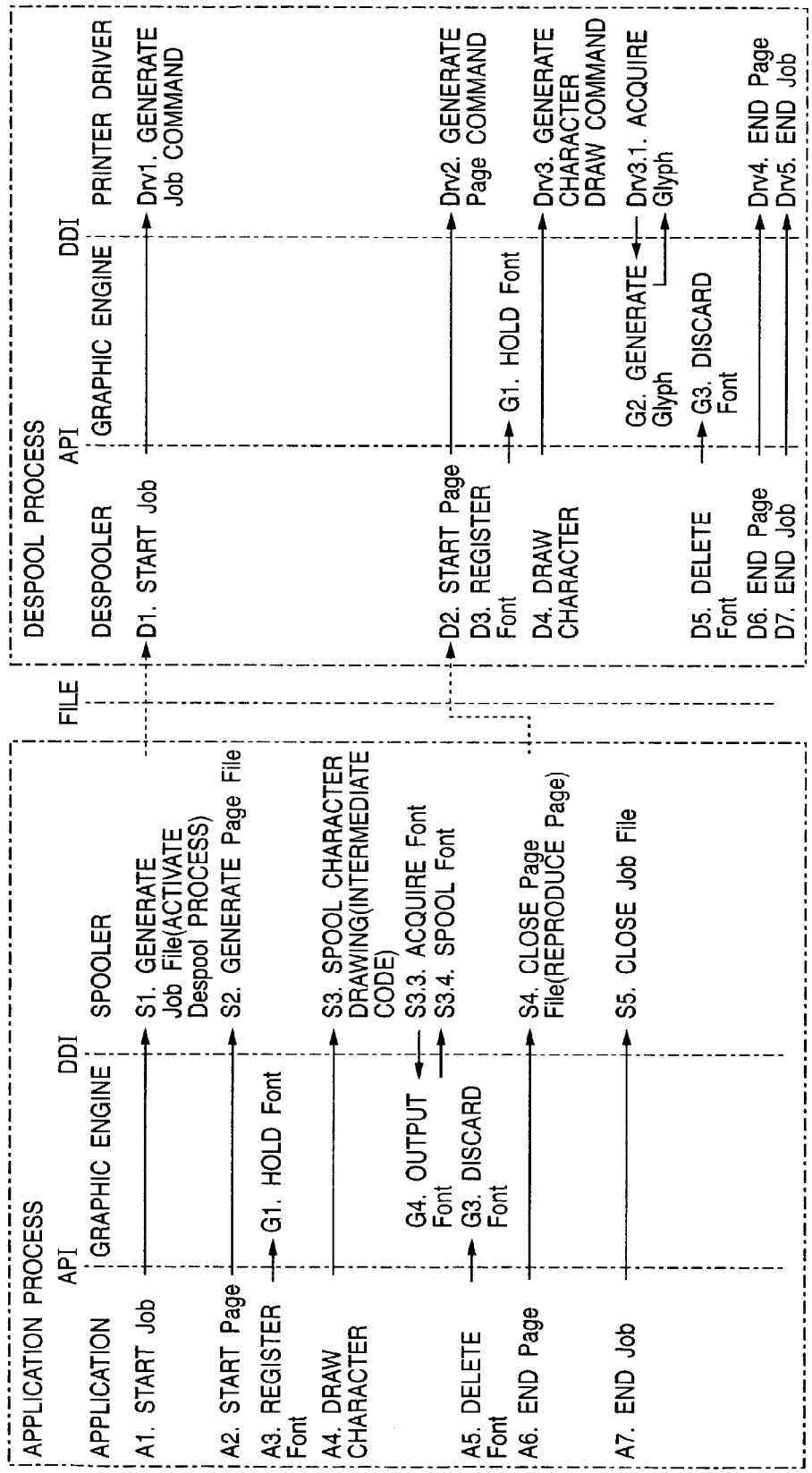
FIG. 15 is a view showing the sequence of a printing process in a printing control apparatus according to the first embodiment of the present invention.
Figure 16:
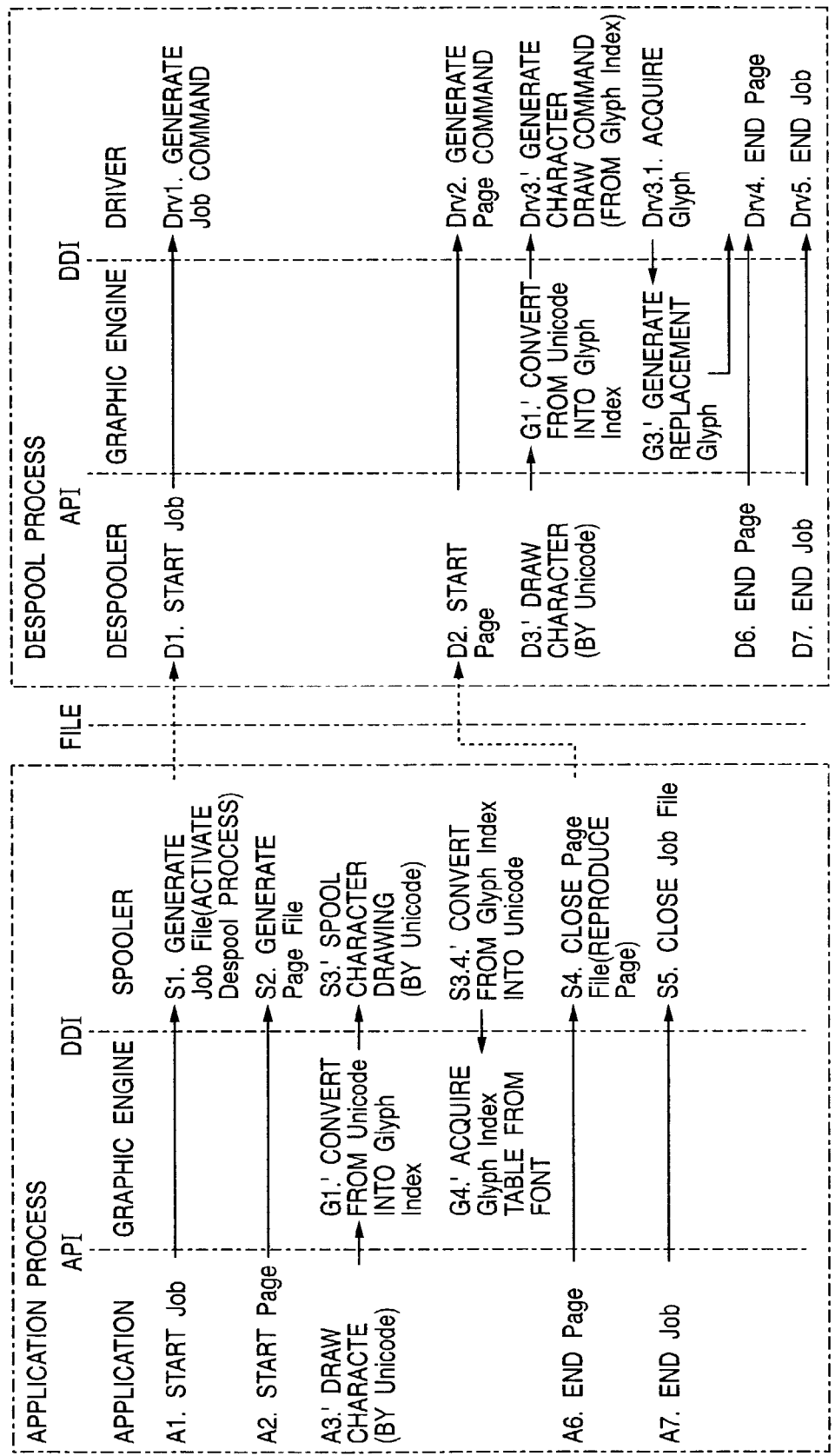
FIG. 16 is a view showing the sequence of a printing process in a printing control apparatus according to the second embodiment of the present invention.

Also, the same reference numerals as in FIG. 15 denote the same processes in FIG. 16, and a repetitive explanation thereof will be omitted.

In the following embodiment, assume that an OS running on the host computer 3000 as a printing control apparatus supports only ShiftJIS, and that a glyph index table of a font registered in the OS contains a character code system (in this embodiment, Unicode) other than ShiftJIS.

Steps A1 to S2 are the same as explained in the first embodiment with reference to FIG. 15.

Step A3'. An application 201 uses, e.g., Unicode to request character drawing which cannot be expressed by, e.g., ShiftJIS (i.e., no corresponding characters of which are defined in ShiftJIS) (the application 201 calls a GDI function).

Step G1'. From the called GDI function, a graphic engine 202 detects that the used character code is Unicode. Since Unicode cannot be used in the OS, the graphic engine 202 looks up a glyph index table corresponding to the character font designated by Unicode, and transfers, to a printer driver 203, a glyph index corresponding to the designated character code (Unicode) as a character code of character drawing in the form of a DDI function. The graphic engine 202 indicates that the DDI function contains the glyph index, rather than a character code.

Step S3'. A spooler 302 performs spooling in an intermediate code format by using a character code, rather than the glyph index (information obtainable from a DDI function are only "glyph index, font attributes, and drawing attributes", and no actual font (glyph) is contained) transferred by the DDI function from the graphic engine 202. To convert the glyph index acquired from the DDI function into a character code, the spooler 302 executes step S3.4' below.

Step S3.4'. The spooler 302 uses font attributes of the information received by the DDI function to request the graphic engine 202 to acquire information of the glyph index table.

Step G4'. The graphic engine 202 acquires the glyph index table corresponding to the font attributes received from the spooler 302, and transfers the table to the spooler 302. The spooler 302 uses the acquired glyph index table to obtain a character code (in this case Unicode, but it can also be another code system) corresponding to the glyph index, and spools the character drawing information in an intermediate data format by using the character code (Unicode).

Steps A6 to Drv2 are the same as in FIG. 15.

Step D3'. A despooler 305 calls a GDI function to reproduce character drawing described in the intermediate code spooled by the spooler 302. The character code of this intermediate code is font-independent Unicode converted in step S3.4'.

Step G1'. From the called GDI function, the graphic engine 202 detects that the character code used is Unicode. Since Unicode cannot be used in the OS, the graphic engine 202 looks up a glyph index table corresponding to the character font designated by Unicode, and transfers, to the printer driver 203, a glyph index corresponding to the designated character code (Unicode) as a character code of character drawing in the form of a DDI function. The graphic engine 202 indicates that the DDI function contains the glyph index, rather than a character code.

Step Drv3'. To generate a character drawing command, the printer driver 203 acquires a character glyph by the following processing by using the glyph index as a character code.

Step Drv3.1'. The printer driver 203 acquires a character glyph from the graphic engine 202 by using the glyph index.

Step G3'. The graphic engine 202 searches for a font having the face name designated by the font attributes. If a font having the designated face name exists, a glyph can be acquired by the font-dependent glyph index. However, if this font of interest is an embedded font, the application has already discarded the font registered in the system (OS). If the designated font is not present on the graphic engine 202, the graphic engine 202 performs font replacement to form a glyph by using a font of a type close to the designated font or by using a predetermined replacement font.

When this is the case, the printer driver 203 acquires a glyph by using a font-independent code (in this embodiment, Unicode). Therefore, even when the designated font is unusable, only the type of font changes, so the character is not garbled and is always output. Consequently, a glyph of the character intended by the user can be acquired.

After that, processes in steps D6 to Drv5 are performed in the same manner as in the first embodiment to complete the whole processing.

In the second embodiment as described above, when spooling is to be performed, information of a font which cannot be directly obtained from a DDI function is obtained by calling a GDI function. A glyph index table is acquired from this font, and a glyph index transferred from a DDI function is converted into a character code and spooled. Accordingly, an intermediate code of character drawing reproduced by the despooler 305 is no longer font-dependent, so no character deformation occurs even when the designated font is replaced with another font. Also, the processing is performed using a general character code, and this facilitates processing in the despooler 305 such as replacement to a built-in font of a printer.

Figure 14:
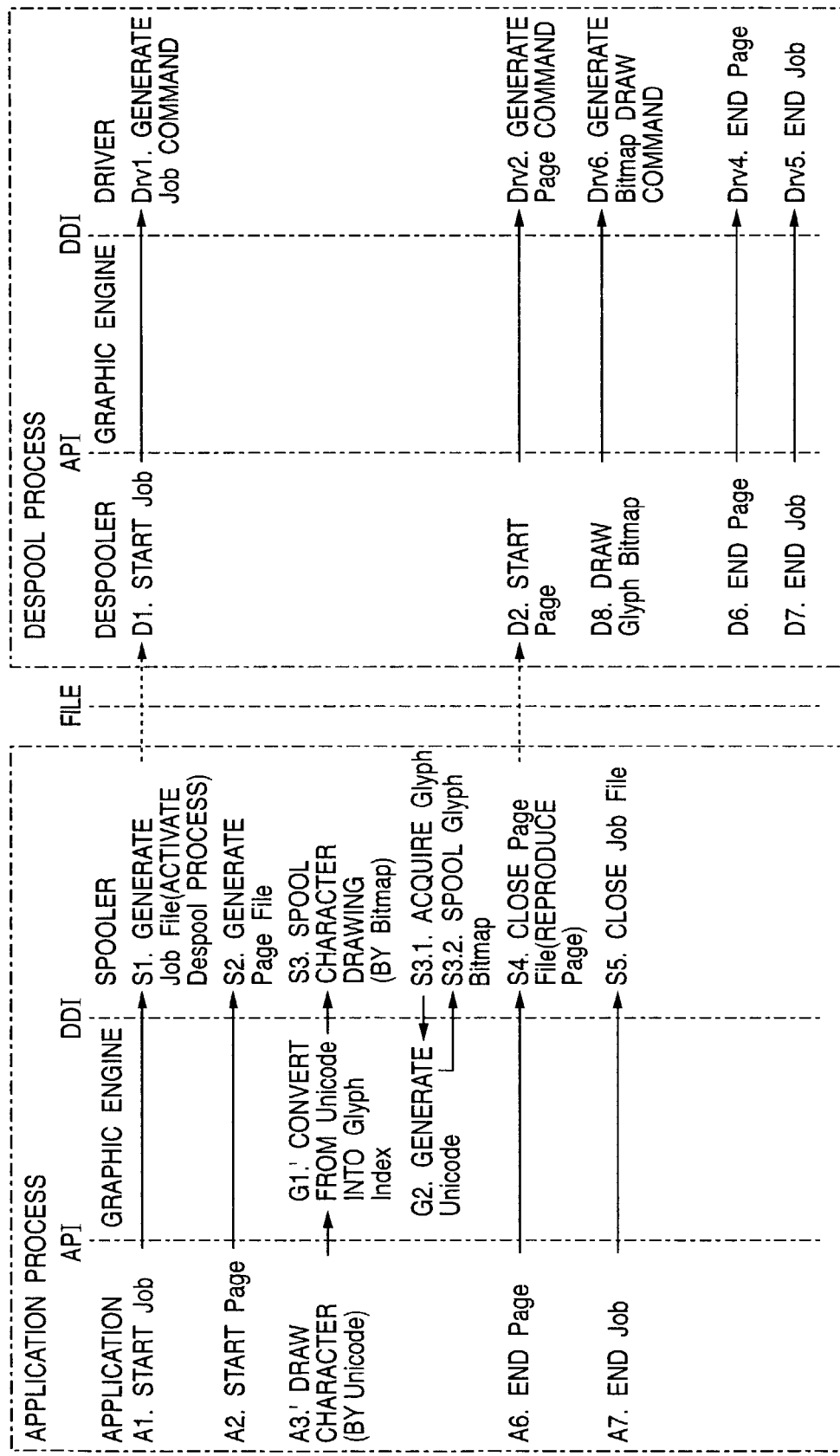
FIG. 14 is a view showing another sequence when bitmap replacement occurs, as a printing process in the printing control apparatus shown in FIG. 4.

Some fonts define two or more glyph indices for the same character code by modification applied to character drawing, e.g., Japanese vertical writing or the formation of a single character by narrowing of the spacing between two characters. If a glyph index transferred in relation to such a font is inversely converted into a character code and spooled, information of character modification may be lost. Therefore, when a glyph index is converted into a character code by using a glyph index table in step S3.4, whether there is such a problem is checked. If it is desirable not to inversely convert into a character code, a glyph index is not converted into a character code, and bitmap conversion of character drawing as explained in FIG. 14 is performed. This can minimize a difference from the output intended by the user.

Also, glyph index tables of some fonts do not support a character code supported by a built-in font of a printer. If this is the case, a command is generated as a character glyph without any replacement to the built-in font of the printer.

In this embodiment, the spooler converts a glyph index into Unicode which is the same character code as designated by the application. However, a glyph index need not be converted into a character code of the same system as designated. That is, a glyph index can be spooled as it is converted into a character code of an arbitrary system contained in a glyph index table.

When a glyph index is to be converted into a character code by using a glyph index table, however, this glyph index is preferably converted into a character code of a code system which supports as many types of characters as possible.

The present invention can be applied to a system constituted by a plurality of devices (e.g., a host computer, interface, reader, and printer) or to an apparatus (e.g., a copying machine, printer, or facsimile apparatus) comprising a single device.

Further, the object of the present invention can also be achieved when a computer (or a CPU or MPU) of a system or apparatus reads out and executes program codes, stored in a storage medium, of software for implementing the functions of the above embodiments.

In this case, the program codes read out from the storage medium implement the functions of the present invention, and the storage medium storing these program codes constitutes the invention.

As this storage medium for supplying the program codes, it is possible to use, e.g., a floppy disk, hard disk, optical disk, magnetooptical disk, CD-ROM, CD-R, magnetic tape, nonvolatile memory card, and ROM.

Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension card inserted into the computer or of a function extension unit connected to the computer, and, in accordance with designations by the program codes, a CPU or the like of the function extension card or function extension unit performs part or the whole of actual processing and thereby implements the functions of the above embodiments.

When the present invention is applied to the storage medium, this storage medium stores at least program codes corresponding to the sequence charts (shown in FIGS. 15 and 16) explained previously.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A printing control apparatus for convening a drawing instruction from an application into a control command suited to a predetermined printing apparatus, and outputting the control command, comprising:
   a spooler adapted to convert the drawing instruction into intermediate data having a format different from the control command, and to store the intermediate data;
   a despooler adapted to read out the stored intermediate data; and
   a printer driver adapted to convert the intermediate data read out by said despooler into the control command and to output the control command,
   wherein said spooler writes information representing a character drawing into a spool file as an intermediate code and, if a font is determined as an embedded font, which was registered into a graphic engine by the application from application data and is to be discarded from the graphic engine, acquires the font from the graphic engine and spools the acquired font into the spool file in the intermediate data format, and
   wherein said despooler registers, if the spool file includes the embedded font, the embedded font included in the spool file into the graphic engine, and
   wherein said printer driver converts the intermediate data into the control command by using the registered font in the graphic engine.

2. The apparatus according to claim 1, wherein said printer driver uses the registered embedded font in the graphic engine as a font having a font name different from a font name used when said spooler spools the embedded font.

3. The apparatus according to claim 1, wherein if said spooler fails to acquire the embedded font, said spooler generates the intermediate data by performing bitmap replacement for the embedded font.

4. The apparatus according to claim 1, wherein if said spooler fails to acquire the embedded font, said printer driver generates the control command by replacing the embedded font with another font.

5. A printing control method of converting a drawing instruction from an application into a control command suited to a predetermined printing apparatus, and outputting the control command, comprising:
   the intermediate data generation step of converting the drawing instruction into intermediate data having a format different from the control command, and storing the intermediate data;
   the reading step of reading out the stored intermediate data; and
   the control command generation step of converting the read intermediate data into the control command and outputting the control command,
   wherein the intermediate data generation step writes information representing a character drawing into a spool file as an intermediate code and if a font is determined as an embedded font, which was registered into a graphic engine by the application from application data and is to be discarded from the graphic engine, acquires the font from the graphic engine and spools the acquired font into the spool file in the intermediate data format,
   wherein said reading step registers, if the spool file includes the embedded font, the embedded font included in the spool file into the graphic engine, and
   wherein, in the control command generation step, the intermediate data is converted into the control command by using the registered font in the graphic engine.

6. The method according to claim 5, wherein in the control command generation step, the registered embedded font is used as a font having a font name different from a font name used when embedded font is spooled in the intermediate data generation step.

7. The method according to claim 5, wherein if the embedded font cannot be acquired in the intermediate data generation step, the intermediate data is generated in the intermediate data generation step by performing bitmap replacement for the embedded font.

8. The method according to claim 5, wherein if the embedded font cannot be acquired in the intermediate data generation step, the control command is generated in the control command generation step by replacing the embedded font with another font.

9. A computer readable storage medium storing a computer program for allowing a computer to function as a printing control apparatus according to claim 1.

10. A printing control apparatus comprising:
    a spooler which writes information representing a character drawing into a spool file as an intermediate data and, if a font is an embedded font, which was registered into a graphic engine by an application from application data and is to be discarded from the graphic engine, requests acquisition of the font, and spools the acquired font in intermediate data format into a spool file;
    a despooler which registers, if the spool file includes the embedded font, the embedded font in the spool file into the graphic engine; and
    a driver which converts information, read out from said spooler and representing the character drawing, into a PDL by acquiring a character glyph on the basis of the font registered in the graphic engine by said despooler.

11. The apparatus according to claim 10, wherein said despooler changes a face name when registering the font.

12. A printing control method comprising:
    the spooling step of writing information representing a character drawing into a spool file as an intermediate data and, if a font is an embedded font, which was registered into a graphic engine by an application from application data and is to be discarded from the graphic engine, requesting acquisition of the font, and spooling the acquired font in intermediate data format into the spool file;

the registration step of registering, if the spool file include the embedded font, the embedded font in the spool file into the graphic engine; and the conversion step of converting information, read out from said spool file and representing the character drawing, into a PDL by acquiring a character glyph on the basis of the font registered in the graphic engine by said registration step.

13. The method according to claim 12, wherein in the registration step, a face name is changed when registering the font.

14. A computer program stored on a computer-readable storage medium, the computer program comprising:

a program of the spooling step of writing information representing a character drawing into a spool file as intermediate data and, if a font is an embedded font, which was registered into a graphic engine by an application from application data and is to be discarded from the graphic engine, requesting acquisition of the font, and spooling the acquired font in intermediate data format into the spool file;

a program of the registration step of registering, if the spool file includes the embedded font, the embedded font in the spool file into the graphic engine; and a program of the conversion step of converting information, read out from said spool file and representing the character drawing, into a PDL by acquiring a character glyph on the basis of the font registered in the graphic engine by said registration step.

15. The program according to claim 14, wherein the program of the registration step changes a face name when registering the font.

16. A computer readable storage medium storing:

a program of the spooling step of writing information representing a character drawing into a spool file as an intermediate data and, if a font is an embedded font, which was registered into a graphic engine by an application from application data, requesting acquisition of the font, and spooling the acquired font in intermediate data format into the spool file;

a program of the registration step of registering, if the spool file includes the embedded font, the embedded font in the spool file into the graphic engine; and a program of the conversion step of converting information, read out from said spool file and representing the character drawing, into a PDL by acquiring a character glyph on the basis of the font registered in the graphic engine by said registration step.

17. The medium according to claim 16, wherein the program of the registration step changes a face name when registering the font.

* * * * *

UNITED STATES PATENT AND TRADEMARK OFFICE
CERTIFICATE OF CORRECTION

PATENT NO. : 7,319,532 B2
APPLICATION NO. : 10/180139
DATED : January 15, 2008
INVENTOR(S) : Oomura et al.

It is certified that error appears in the above-identified patent and that said Letters Patent is hereby corrected as shown below:

DRAWINGS:
    Figure 16, "CHARACTE" should read -- CHARACTER --.

COLUMN 2:
    Line 41, "maybe" should read -- may be --.

COLUMN 12:
    Line 33, "comprising" should read -- comprising: a --; and
    Line 42, "to" should read -- to a --.

COLUMN 17:
    Line 47, "basis" should read -- basis of --;
    Line 61, "the" should read -- a --; and
    Line 61, "ROM 13," should read -- ROM 13b, --.

COLUMN 19:
    Line 44, "DDT function" should read -- DDI function --.

COLUMN 20:
    Line 55, "step S2." should read -- step S2 --.

COLUMN 21:
    Line 3, "corresponding" should read -- corresponding to --.

COLUMN 24:
    Line 57, "are" should read -- being --.

COLUMN 25:
    Line 24, Claim 1 "convening" should read -- converting --.

UNITED STATES PATENT AND TRADEMARK OFFICE
CERTIFICATE OF CORRECTION

PATENT NO.         : 7,319,532 B2
APPLICATION NO.    : 10/180139
DATED              : January 15, 2008
INVENTOR(S)        : Oomura et al.

It is certified that error appears in the above-identified patent and that said Letters Patent is hereby corrected as shown below:

COLUMN 26:
Line 28, Claim 6 "when" should read -- when the --.

COLUMN 27:
Line 4, Claim 12 "include" should read -- includes --.

Signed and Sealed this

Twelfth Day of August, 2008

JON W. DUDAS
*Director of the United States Patent and Trademark Office*